United States Patent
Tanaka et al.

(10) Patent No.: US 9,288,397 B2
(45) Date of Patent: Mar. 15, 2016

(54) IMAGING DEVICE, METHOD FOR PROCESSING IMAGE, AND PROGRAM PRODUCT FOR PROCESSING IMAGE

(71) Applicant: OLYMPUS CORPORATION, Tokyo (JP)

(72) Inventors: Yoshinobu Tanaka, Tokyo (JP); Takashi Yanada, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 36 days.

(21) Appl. No.: 14/050,967

(22) Filed: Oct. 10, 2013

(65) Prior Publication Data

US 2014/0104459 A1   Apr. 17, 2014

(30) Foreign Application Priority Data

Oct. 12, 2012 (JP) ................................. 2012-227016

(51) Int. Cl.
| | | |
|---|---|---|
| *H04N 5/262* | (2006.01) | |
| *H04N 5/228* | (2006.01) | |
| *H04N 5/232* | (2006.01) | |

(52) U.S. Cl.
CPC ....... *H04N 5/23296* (2013.01); *H04N 5/23229* (2013.01)

(58) Field of Classification Search
CPC .. H04N 5/3454; H04N 5/3456; H04N 3/1562
USPC .......... 348/240.2, 218.1, 220.1, 222.1, 240.3, 348/350; 382/298
See application file for complete search history.

(56) References Cited

U.S. PATENT DOCUMENTS

| | | | | |
|---|---|---|---|---|
| 6,947,082 | B2* | 9/2005 | Gomi | 348/240.2 |
| 7,679,657 | B2* | 3/2010 | Morita | 348/240.2 |
| 7,848,575 | B2* | 12/2010 | Watanabe et al. | 382/192 |
| 2004/0239780 | A1* | 12/2004 | Nakahira | 348/240.2 |
| 2005/0057662 | A1* | 3/2005 | Washisu | H04N 5/2253 348/208.99 |
| 2006/0125937 | A1* | 6/2006 | LeGall et al. | 348/240.99 |
| 2006/0221213 | A1* | 10/2006 | Watanabe et al. | 348/240.3 |
| 2007/0024737 | A1* | 2/2007 | Nakamura et al. | 348/335 |
| 2008/0247662 | A1* | 10/2008 | Yasuma | G06T 3/4015 382/264 |
| 2009/0195660 | A1* | 8/2009 | Kashiwagi | G06T 3/4038 348/207.2 |
| 2011/0242369 | A1* | 10/2011 | Misawa et al. | 348/240.2 |

FOREIGN PATENT DOCUMENTS

| | | |
|---|---|---|
| JP | 2004-15517 A | 1/2004 |
| JP | 4697078 B2 | 6/2011 |

* cited by examiner

*Primary Examiner* — Sinh Tran
*Assistant Examiner* — Xi Wang
(74) *Attorney, Agent, or Firm* — Westerman, Hattori, Daniels & Adrian, LLP

(57) ABSTRACT

For pixel signals of a plurality of pixels arranged in a first pixel area arranged in a two dimensional matrix form, a size of the first pixel area is converted to output first image data, and for pixel signals of pixels arranged in a second pixel area smaller than the first pixel area, a size of the second pixel area is converted to output second image data, wherein an operating mode is changed in response to the size of the second pixel area.

11 Claims, 9 Drawing Sheets

IMAGING DEVICE, METHOD FOR PROCESSING IMAGE, AND PROGRAM PRODUCT FOR PROCESSING IMAGE

BACKGROUND OF THE INVENTION

1. Field of the Invention

The present invention relates to an imaging device, a method of processing an image, and a program product of processing an image.

Priority is claimed on Japanese Patent Application No. 2012-227016, filed Oct. 12, 2012, the content of which is incorporated herein by reference.

2. Description of Related Art

In general, an imaging device capable of capturing a moving image, such as a digital still camera or a video camera, has a zoom function such as an optical zoom or an electronic zoom. When the zoom function is used, it is possible to capture an object in various pixel areas from a wide angle to telephoto.

For example, Japanese Patent No. 4697078 discloses a technology of an imaging device having a function of simultaneously capturing a wide angle image and a telescopic image. In this technology, data of a captured image is trimmed, so that a plurality of images (for example, two images of an original captured wide angle image and a trimmed telescopic image) having different pixel areas are recorded as one synthesized image.

Furthermore, for example, Japanese Unexamined Patent Application, First Publication No. 2004-15517 discloses a technology of a display device that simultaneously displays an image obtained by reducing the whole of a captured area and an image obtained by expanding a partial area.

When the technologies disclosed in Japanese Patent No. 4697078 and Japanese Unexamined Patent Application, First Publication No. 2004-15517 are used, it is possible to simultaneously capture a plurality of images having different pixel areas and to simultaneously display and check them, as with the wide angle image and the telescopic image.

SUMMARY OF THE INVENTION

According to a first aspect of the present invention, there is provided an imaging device including: a solid-state imaging device which has a plurality of pixels arranged in a two dimensional matrix form, the solid-state imaging device outputting pixel signals corresponding to object light incident on the plurality of pixels in at least two operating modes; a first conversion section which performs a first conversion process of converting a size of a predetermined first pixel area to a predetermined size with respect to the pixel signals, which are output from the pixels arranged in the first pixel area, within an area of all the pixels arranged in the solid-state imaging device to output first image data; a second conversion section which performs a second conversion process of converting a size of a second pixel area to a predetermined size with respect to the pixel signals output from the pixels arranged in the second pixel area, which is smaller than the first pixel area, within the area of all the pixels arranged in the solid-state imaging device to output second image data; and an operating mode change unit which changes an operating mode of the solid-state imaging device in response to the size of the second pixel area.

Furthermore, according to a second aspect of the present invention, in the first aspect, the second pixel area may be decided based on a size of a main object included in the first pixel area, and the operating mode change unit may drive the solid-state imaging device in a first operating mode in which the pixel signals of all the pixels included in the solid-state imaging device are output when a number of the pixels included in the second pixel area is smaller than a predetermined threshold value, and drive the solid-state imaging device in a second operating mode in which pixel signals having a number smaller than the number of pixel signals output in the first operating mode are output when the number of pixels included in the second pixel area is equal to or more than the threshold value.

Furthermore, according to a third aspect of the present invention, in the second aspect, in the second operating mode, the pixel signals output from all the pixels included in the solid-state imaging device may be added or thinned every predetermined number of pixel signals, and added pixel signals or pixel signals remaining through thinning may be output.

Furthermore, according to a fourth aspect of the present invention, in the third aspect, the first conversion process may be a process of resizing an area of pixels corresponding to the size of the first pixel area to an area with a predetermined size in a row direction and a column direction, and the second conversion process may be a process of cutting out an area corresponding to the size of the second pixel area from the area of the pixels corresponding to the size of the first pixel area.

Furthermore, according to a fifth aspect of the present invention, in the second aspect, in the second operating mode, the pixel signals output from all the pixels included in the solid-state imaging device may be added or thinned every predetermined number of rows or columns, and added pixel signals or pixel signals remaining through thinning may be output.

Furthermore, according to a sixth aspect of the present invention, in the fifth aspect, the first conversion process may be a process of resizing an area of pixels corresponding to the size of the first pixel area to an area with a predetermined size in a row direction and a column direction, the second conversion process may be a process of cutting out an area of pixels corresponding to the size of the second pixel area from the area of the pixels corresponding to the size of the first pixel area, and a process of resizing an area of pixels corresponding to the size of the second pixel area to an area with a predetermined size in the row direction or the column direction, and the second conversion section may perform a process of cutting out the second pixel area and may further perform a resizing process in the row direction when the solid-state imaging device reduces the pixel signals in the second operating mode in the column direction, and may perform a process of cutting out the second pixel area and further performs a resizing process in the column direction when the solid-state imaging device reduces the pixel signals in the second operating mode in the row direction.

Furthermore, according to a seventh aspect of the present invention, in the third aspect, the first conversion process may be a process of resizing an area of pixels corresponding to the size of the first pixel area to an area with a predetermined size in a row direction and a column direction, the second conversion process may be a process of cutting out an area corresponding to the size of the second pixel area from the area of the pixels corresponding to the size of the first pixel area, and a process of resizing an area of pixels corresponding to the size of the second pixel area to an area with a predetermined size in the row direction and the column direction, and the second conversion section may perform a process of cutting out the second pixel area from an area of the pixel signals output from the solid-state imaging device, and may further perform a resizing process in the row direction and the column direction.

According to an eighth aspect of the present invention, there is provided a method for processing an image including: a first conversion step of performing a first conversion process of converting a size of a predetermined first pixel area to a predetermined size with respect to the pixel signals, which are output from the pixels arranged in the first pixel area, within an area of all pixels arranged in a two dimensional matrix form, and outputting first image data; a second conversion step of performing a second conversion process of converting a size of a second pixel area to a predetermined size with respect to the pixel signals output from the pixels arranged in the second pixel area, which is smaller than the first pixel area, within the area of all the pixels, and outputting second image data; and an operating mode change step of changing an operating mode, in which pixel signals are output from the pixels, in response to the size of the second pixel area.

According to a ninth aspect of the present invention, there is provided a program product for processing an image, which includes a program to execute: a first conversion step of performing a first conversion process of converting a size of a predetermined first pixel area to a predetermined size with respect to the pixel signals, which are output from the pixels arranged in the first pixel area, within an area of all pixels arranged in a two dimensional matrix form, and outputting first image data; a second conversion step of performing a second conversion process of converting a size of a second pixel area to a predetermined size with respect to the pixel signals output from the pixels arranged in the second pixel area, which is smaller than the first pixel area, within the area of all the pixels, and outputting second image data; and an operating mode change step of changing an operating mode, in which pixel signals are output from the pixels, in response to the size of the second pixel area.

DETAILED DESCRIPTION OF THE INVENTION (First Embodiment)

Figure 1:
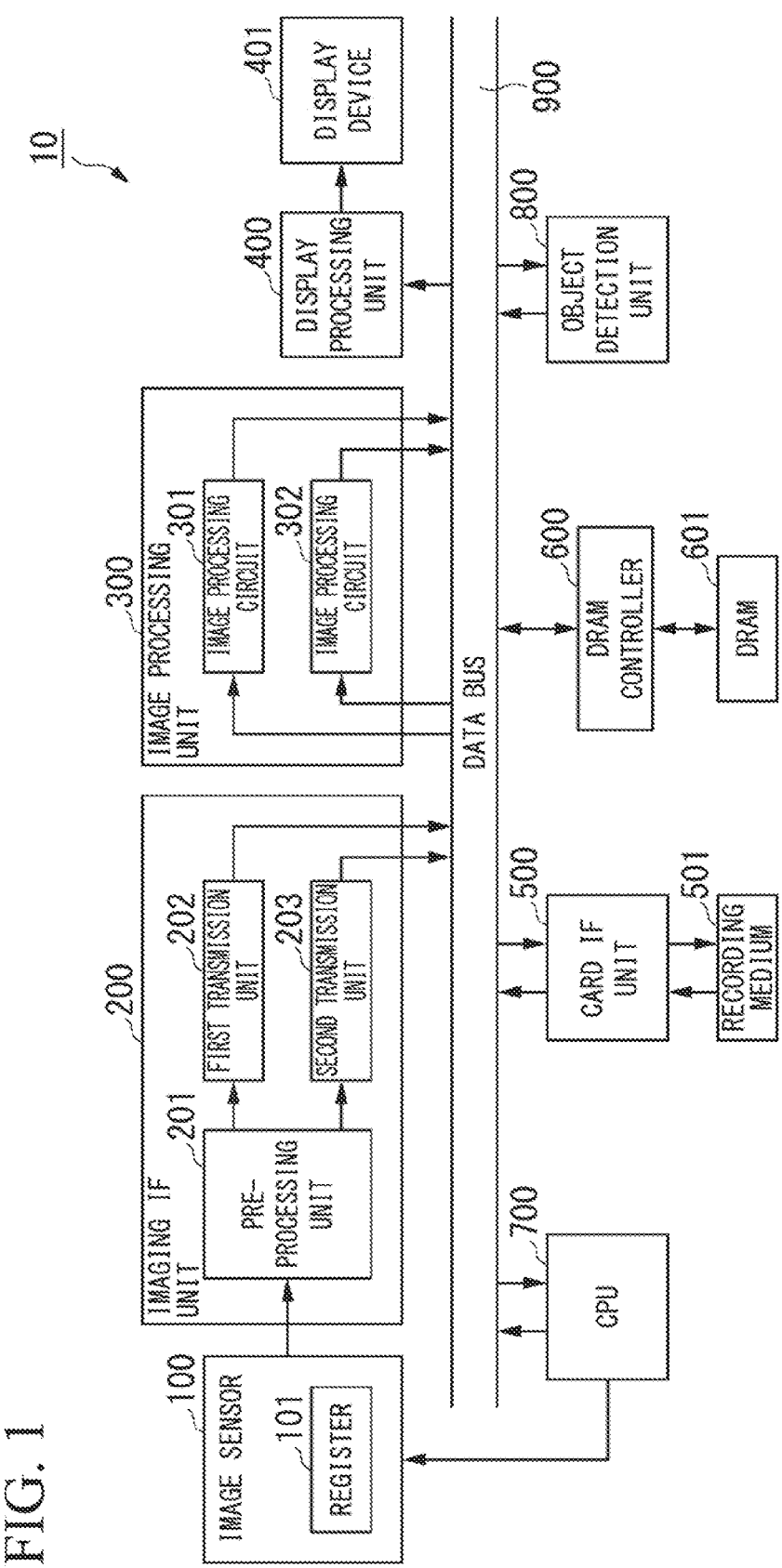
FIG. 1 is a block diagram illustrating a schematic configuration of an imaging device in a first embodiment of the present invention.

Hereinafter, an embodiment of the present invention will be described with reference to the accompanying drawings. FIG. 1 is a block diagram illustrating a schematic configuration of an imaging device in a first embodiment of the present invention. In FIG. 1, an imaging device 10 includes an image sensor 100, an imaging IF (interface) unit 200, an image processing unit 300, a display processing unit 400, a display device 401, a card IF (interface) unit 500, a recording medium 501, a DRAM controller 600, a DRAM (Dynamic Random Access Memory) 601, a CPU 700, and an object detection unit 800.

The imaging IF unit 200, the image processing unit 300, the display processing unit 400), the card IF unit 500, the DRAM controller 600, the CPU 700, and the object detection unit 800 in the imaging device 10 are connected to one another through a data bus 900, and for example, read data from the DRAM 601 connected to the DRAM controller 600 and write data to the DRAM 601 through DMA (Direct Memory Access).

The imaging device 10 is able to simultaneously capture a plurality of images having different pixel areas (that is, sizes of pixel areas) through one-time capturing. In the following description, the imaging device 10 simultaneously captures two images having pixel areas with different sizes. One (hereinafter referred to as a "first image") of the captured images has a certain pixel area (hereinafter referred to as a "first pixel area"). The other (hereinafter referred to as a "second image") of the captured images has a pixel area (hereinafter referred to as a "second pixel area") smaller than the first pixel area. That is, the first image is an image that is captured when a zoom lens has been controlled to a wide angle side. The second image is an image that is captured in the same state as that in which a zoom lens has been controlled at a telescopic side.

The image sensor 100 is a solid-state imaging device represented as a CCD (Charge Coupled Device) image sensor or a CMOS (Complementary Metal-Oxide Semiconductor) image sensor that performs photoelectric conversion for an optical image of an object having an image formed by a zoom lens (not illustrated). The image sensor 100 outputs a pixel signal corresponding to object light to the imaging IF unit 200 as input image data.

The image sensor 100 is able to be driven in a plurality of operating modes such as an operating mode (hereinafter referred to as a "still mode") in which all pixel signals are output, and an operating mode (hereinafter referred to as a "pixel addition mode") in which pixel signals are added to every predetermined number of pixels and are output. The image sensor 100 includes a register 101 that performs setting of the operating modes of the image sensor 100. The operating modes are set in the register 101 by the CPU 700, so that it is possible to change the driving of the image sensor 100.

In addition, a configuration for changing the operating modes of the image sensor 100 is not limited only to the configuration using the register 101 illustrated in FIG. 1. For example, various configurations, such as a change in the operating modes in response to the states of input terminals of the image sensor 100, are considered.

The imaging IF unit 200 receives the input image data input from the image sensor 100, performs processes including a pre-process, a resizing process, a cut-out process and the like, and transmits (writes) image data of a processing resultant to (in) the DRAM 601. The imaging IF unit 200 includes a pre-processing section 201, a first transmission section 202, and a second transmission section 203. Through the first transmission section 202 and the second transmission section 203 provided in the imaging IF unit 200, respective image data for generating two images having different pixel areas is transmitted to (written in) the DRAM 601.

The pre-processing section 201 performs a pre-process, such as scratch correction (pixel defect correction) or shading correction, on the input image data input from the image sensor 100, and outputs image data (hereinafter referred to as "pre-processed image data") of a pre-processing resultant to the first transmission section 202 and the second transmission section 203.

Each of the first transmission section 202 and the second transmission section 203 performs a process of changing a pixel area, such as a resizing process or a cut-out process, on the pre-processed image data input from the pre-processing section 201, and transmits (writes) image data of a processing resultant to (in) the DRAM 601. In more detail, when the imaging device 10 simultaneously captures the first image and the second image, the first transmission section 202 performs the process of changing a pixel area on the pre-processed image data, and transmits (writes) image data (hereinafter referred to as "first image data") in which the pre-processed image data has been changed to a pixel area of a wide angle side to (in) the DRAM 601. Furthermore, the second transmission section 203 performs the process of changing a pixel area on the pre-processed image data, and transmits (writes) image data (hereinafter referred to as "second image data") in which the pre-processed image data has been changed to a pixel area of a telescopic side to (in) the DRAM 601. In addition, a detailed description related to the processes of changing a pixel area, which are performed by the first transmission section 202 and the second transmission section 203, will be given later.

In addition, when performing the process of changing a pixel area, each (particularly, the second transmission section 203) of the first transmission section 202 and the second transmission section 203 is able to change the pixel area to a pixel area with an appropriate size at an appropriate position using information on the position and the size of a main object detected by the object detection unit 800 which will be described later.

Furthermore, when the imaging device 10 performs normal capturing, the first transmission section 202 transmits (writes) the image data obtained by performing a process on the pre-processed image data to (in) the DRAM 601. In addition, since the normal capturing operation of the imaging device 10 is the same as that of a conventional imaging device, a description thereof will be omitted here.

The image processing unit 300 acquires (reads) the first image data and the second image data recorded in the DRAM 601, performs various image processes such as noise elimination, a YC conversion process, a resizing process, or a moving image compression process including a JPEG compression process, an MPEG compression process, and an H.264 compression process, and generates image data for display and image data for recording. Furthermore, the image processing unit 300 acquires (reads) image data for recording recorded in the DRAM 601, performs various image processes such as a JPEG expansion process, an MPEG expansion process, or an H.264 expansion process, and generates image data for display. Furthermore, the image processing unit 300 transmits (writes) the generated image data for display and image data for recording to the DRAM 601.

The image processing unit 300 includes two image processing circuits of an image processing circuit 301 and an image processing circuit 302. When the imaging device 10 performs normal capturing, the image processing circuit 301 transmits (writes) the image data for display and the image data for recording, which have been generated through the image processes, to the DRAM 601.

Furthermore, when the imaging device 10 simultaneously captures the first image and the second image, the image processing circuit 301 transmits (writes) the image data for display and the image data for recording, which have been generated by performing the image process on the first image data, to the DRAM 601. Furthermore, the image processing circuit 302 transmits (writes) the image data for display and the image data for recording, which have been generated by performing the image process on the second image data, to (in) the DRAM 601, in addition, a detailed description related to the image processes performed by the image processing circuit 301 and the image processing circuit 302 will be given later.

The display processing unit 400 acquires (reads) the image data for display recorded in the DRAM 601, and performs a display process such as a process of superimposing data for OSD (On-Screen Display) display on the acquired image data for display. Then, the display processing unit 400 outputs the display-processed image data to the display device 401.

The display device 401 is a display device such as a TFT (Thin Film Transistor) LCD (Liquid Crystal Display) or an organic EL (Electro Luminescence) display, and displays an image corresponding to the display-processed image data output from the display processing unit 400.

In addition, the display device 401 may be an external display such as a television. Furthermore, in FIG. 1, the display device 401 is also an element of the imaging device 10. However, the display device 401 may be detachable from the imaging device 10.

The card IF unit 500 acquires (reads) the image data for recording recorded in the DRAM 601, and records the image data for recording in the recording medium 501. Furthermore, the card IF unit 500 reads image data recorded in the recording medium 501, and transmits (writes) the read image data to (in) the DRAM 601.

The recording medium 501 is a nonvolatile recording medium such as an SD memory card (SD (trademark) Memory Card) or a Compact Flash (CF (trademark)), and records the image data for recording output from the card IF unit 500. Furthermore, image data recorded by the card IF unit 500 is read. In addition, in the example of FIG. 1, the recording medium 501 is also an element of the imaging device 10. However, the recording medium 501 may be detachable from the imaging device 10.

The DRAM controller 600 transmits (writes) data to (in) the connected DRAM 601 and acquires (reads) data from the DRAM 601 in response to an access request to the DRAM 601 from a plurality of elements in the imaging device 10 connected to the data bus 900, for example, a DRAM access request.

The DRAM 601 is a memory, the access of which is controlled by the DRAM controller 600. The DRAM 601 records various types of data in the process of the respective elements of the imaging device 10.

The CPU 700 controls the elements of the imaging device 10, that is, the whole of the imaging device 10. For example, the CPU 700 controls an operation of each element of the imaging device 10 in response to a capturing operation or a reproduction operation in the imaging device 10. Furthermore, when the imaging device 10 performs the capturing operation, the CPU 700 sets the operating mode of the image sensor 100 in the register 101 provided in the image sensor 100. Furthermore, for example, when the imaging device 10 performs the capturing operation, the CPU 700 controls a zoom lens (not illustrated) to a wide angle side, a telescopic side, or an intermediate state thereof.

The object detection unit 800 detects the position and the size of a captured main object. The object detection unit 800 has a function (face detection, organ (eyes, nose and the like) detection and the like) of detecting a feature point during capturing, and a function (motion vector detection represented as block matching, tracing of a color component, and the like) of tracing a target part detected once, and detects the position and the size of a main object through these functions. The object detection unit 800 transmits (writes) information on the position and the size of the detected main object to (in) the DRAM 601.

In addition, it may be possible to employ a configuration in which the information on the position and the size of the main object detected by the object detection unit 800 is directly output to the CPU 700, or a configuration in which the information is output to the first transmission section 202 and the second transmission section 203 in the imaging IF unit 200.

Through such a configuration, the imaging device 10 simultaneously captures the two images (the first image and the second image) having pixel areas with different sizes.

Figure 2:
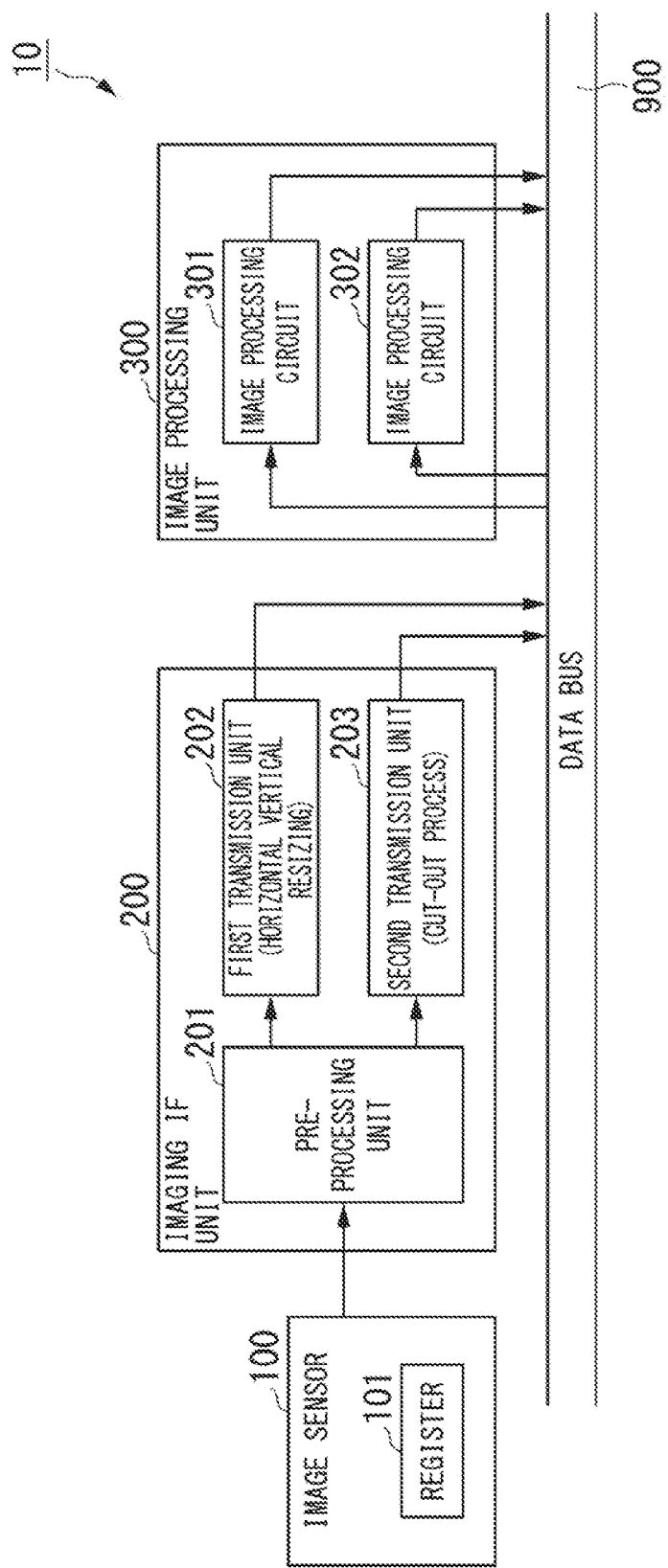
FIG. 2 is a block diagram illustrating a schematic configuration of elements related to the generation of images having pixel areas with different sizes in an imaging device of a first embodiment.

Next, an operation in which the imaging device 10 simultaneously captures the first image and the second image will be described. FIG. 2 is a block diagram illustrating a schematic configuration of elements related to the generation of images having pixel areas with different sizes in the imaging device 10 of the first embodiment. FIG. 2 illustrates only the image sensor 100, the imaging IF unit 200, the image processing unit 300, and the data bus 900 related to the operation for simultaneously capturing the first image and the second image among the elements of the imaging device 10 illustrated in FIG. 1.

As illustrated in FIG. 2, in the imaging device 10, the first transmission section 202 provided in the imaging IF unit 200 has a "horizontal vertical resizing processing function" as a processing function of changing the size of a pixel area, and the second transmission section 203 has a "cut-out processing function" as the processing function of changing the size of the pixel area. In the following description, a case in which the imaging device 10 captures a moving image will be described. The capturing of the moving image in the imaging device 10 is performed in the following procedure.

(Procedure 1): First, the CPU 700 controls the zoom lens to the state of the wide angle side and forms an optical image of an object on the image sensor 100. The image sensor 100 outputs a pixel signal (input image data) corresponding to the imaged object light to the imaging IF unit 200.

(Procedure 2): In the imaging IF unit 200, the pre-processing section 201 first performs a pre-process on the input image data input from the image sensor 100, and outputs the pre-processed image data to the first transmission section 202 and the second transmission section 203. Then, the first transmission section 202 performs the horizontal vertical resizing processing on the pre-processed image data input from the pre-processing section 201, and records (writes) first image data in the DRAM 601. Furthermore, the second transmission section 203 performs the cut-out processing on the pre-processed image data input from the pre-processing section 201, and records (writes) second image data in the DRAM 601.

(Procedure 3): The image processing unit 300 generates image data (hereinafter referred to as "display moving image data") for display and image data (hereinafter referred to as "recording moving image data") for recording of the wide angle side and the telescopic side, which have been obtained by performing the H.264 moving image compression process on the first image data and the second image data recorded in the DRAM 601, and records (writes) the display moving image data and the recording moving image data in the DRAM 601 again.

In addition, when the image processing unit 300 performs the moving image compression process, each of the image processing circuit 301 and the image processing circuit 302 performs the moving image compression process on only one of the first image data and the second image data and generates the display moving image data and the recording moving image data as described above. However, in the following description, when the display moving image data and the recording moving image data are expressed without being distinguished from each other, they are simply called "moving image data."

Then, the display processing unit 400 allows the display moving image data recorded in the DRAM 601 to be displayed on the display device 401. At this time, the display processing unit 400 is able to allow only the display moving image data of one of the wide angle side and the telescopic side to be displayed on the entire surface of the display device 401. Furthermore, the display processing unit 400 is able to allow two types of display moving image data of the wide angle side and the telescopic side to be simultaneously displayed, for example, on the right and the left of the display device 401, respectively.

Furthermore, the card IF unit 500 allows the recording moving image data recorded in the DRAM 601 to be recorded in the recording medium 501. At this time, the card IF unit 500 is able to allow two types of recording moving image data of the wide angle side and the telescopic side to be recorded in the recording medium 501 as associated separate files. Furthermore, the card IF unit 500 is able to combine (merge) the two types of recording moving image data of the wide angle side and the telescopic side with each other, and to allow the combined data to be recorded in the recording medium 501 as one file. Furthermore, the card IF unit 500 is able to allow only the recording moving image data of one of the wide angle side and the telescopic side to be recorded in the recording medium 501.

Through such a procedure, in the imaging device 10, two types of image data having pixel areas with sizes, that is, the first image data and the second image data, are generated from the input image data captured in the state in which the zoom lens has been controlled to the wide angle side, and the image processing unit 300 performs the moving image compression process on the two types of image data, thereby generating the moving image data of the wide angle side and the moving image data of the telescopic side. Then, the imaging device 10 records (preserves) two types of recording moving image data of the wide angle side and the telescopic side in the recording medium 501 while displaying two types of display moving image data of the wide angle side and the telescopic side on the display device 401. In this way, even when an object moves largely, a photographer (a user) is able to capture the object without missing it.

Hereinafter, an operation of each element when the imaging device 10 simultaneously captures the first image and the second image will be described while focusing on the sizes of the respective images processed by each element, that is, the number of pixels of image data to be processed. The operation of each element provided in the imaging device 10 differs according to the size of the pixel area of the second image corresponding to the size of the main object, that is, the difference in the number of pixels of image data included in the pixel area of the second image that is cut out from the first image.

Figure 3:
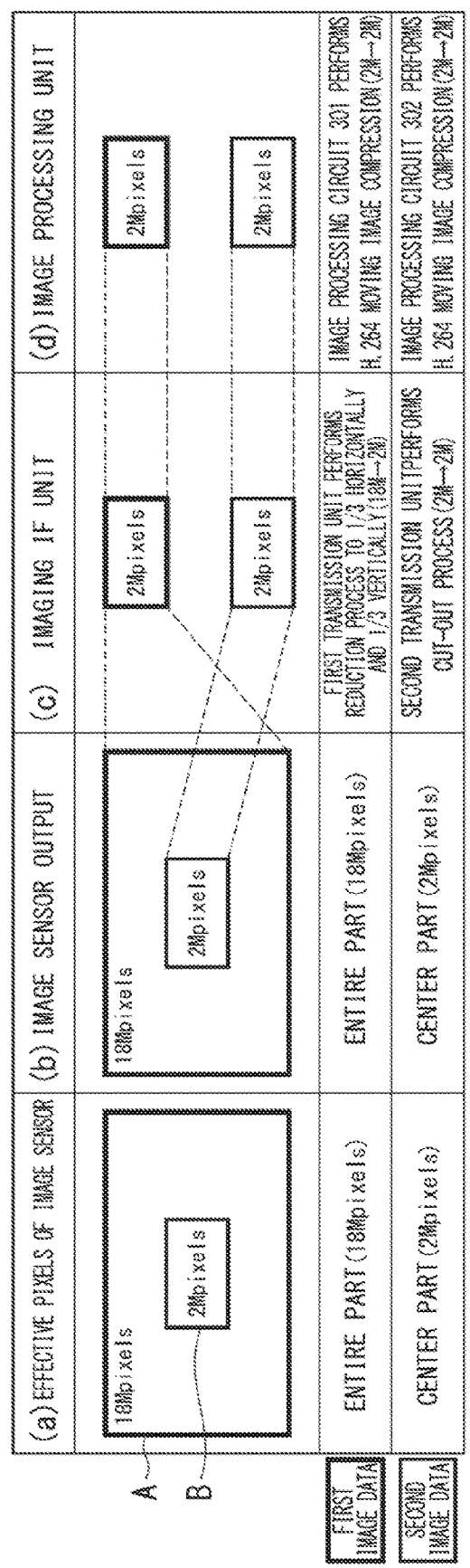
FIG. 3 is a diagram for explaining an example of a relation of the number of pixels between pixels generated in each processing step in an imaging device of a first embodiment.
Figure 4:
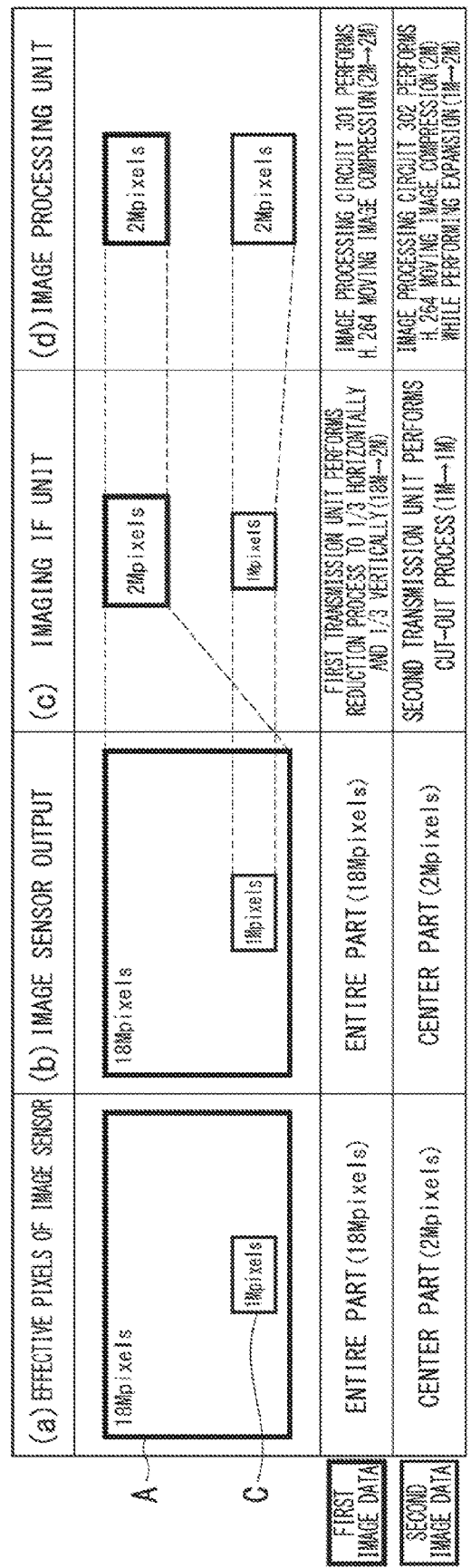
FIG. 4 is a diagram explaining an example of a relation of the number of pixels between pixels generated in each processing step in an imaging device of a first embodiment.
Figure 5:
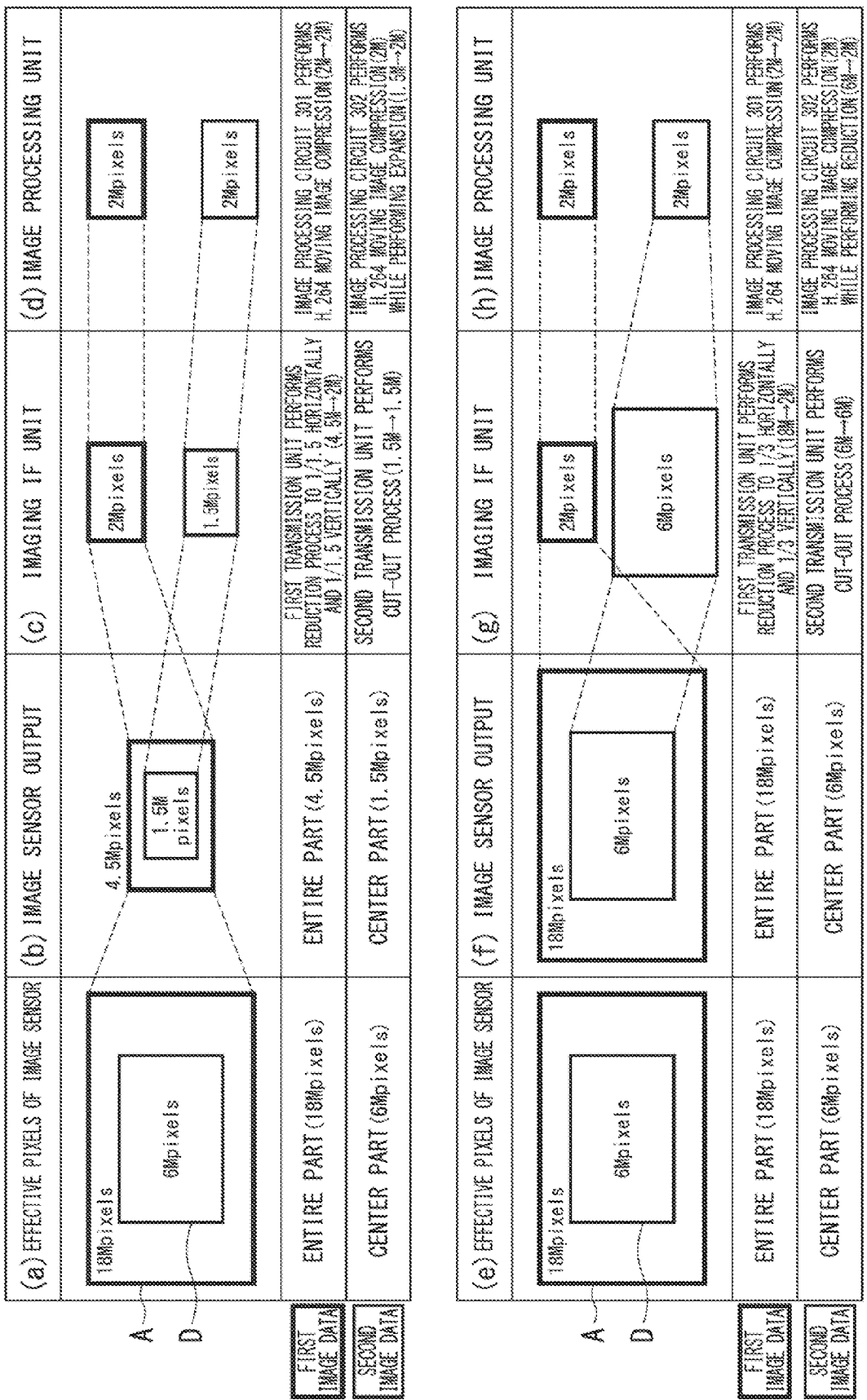
FIG. 5 is a diagram explaining an example of a relation of the number of pixels between pixels generated in each processing step in an imaging device of a first embodiment.

FIG. 3 to FIG. 5 are diagrams for explaining an example of a relation of the number of pixels between pixels generated in each processing step in the imaging device 10 of the first embodiment. Each of FIG. 3 to FIG. 5 illustrates the difference in an operation due to the size of the pixel area of the second image in each element. In addition, FIG. 3 to FIG. 5 illustrate an example in which, when the number of effective pixels of the image sensor 100 is 18 million pixels (18 Mpixels), the imaging device 10 generates moving image data of the wide angle side and moving image data of the telescopic side of 2 million pixels (2 Mpixels) from the input image data of the image sensor 100.

Initially, with reference to FIG. 3, a description of a relation of the number of pixels in each processing step when the number of pixels of the second image data cut out as the second image is equal to the number of pixels (2 Mpixels) of the moving image data of the telescopic side, which is generated by the imaging device 10, will be provided. First, a description of a relation of the number of pixels of the image data that is processed by each element when the imaging device 10 generates the moving image data of the wide angle side will be provided.

In the generation of the moving image data of the wide angle side by the imaging device 10, the image sensor 100 is driven in the still mode in which all pixel signals are output, and outputs input image data (18 Mpixels) of an entire area A of effective pixels of the image sensor 100 illustrated in (a) of FIG. 3 to the imaging IF unit 200 (refer to (b) of FIG. 3).

Then, the imaging IF unit 200 allows the pre-processing section 201 to perform a pre-process on the input image data (18 Mpixels) input from the image sensor 100, and outputs the pre-processed image data (18 Mpixels) to the first transmission section 202. Then, the first transmission section 202 performs the horizontal vertical resizing process on the pre-processed image data, and records (writes) first image data, the number of pixels of which has changed, in the DRAM 601 as illustrated in (c) of FIG. 3. In more detail, the first transmission section 202 performs the horizontal vertical resizing process of reducing the horizontal length of the pre-processed image data of 18 Mpixels by 1/3 and reducing the vertical length thereof by 1/3, changes the pre-processed image data to the first image data of 2 Mpixels, and records (writes) the first image data in the DRAM 601.

Then, the image processing unit 300 performs the moving image compression process on the first image data (2 Mpixels) subject to the horizontal vertical resizing process by the imaging IF unit 200, generates moving image data (2 Mpixels) of the wide angle side as illustrated in (d) of FIG. 3, and records (writes) the moving image data in the DRAM 601 again. In more detail, the image processing circuit 301 performs the H.264 moving image compression process on the first image data (2 Mpixels) subject to the horizontal vertical resizing process by the first transmission section 202, generates the moving image data (2 Mpixels) of the wide angle side, and records (writes) the moving image data in the DRAM 601 again. The moving image data (2 Mpixels) of the wide angle side generated as above is displayed on the display device 401 or recorded (preserved) in the recording medium 501 thereafter.

Next, a description of a relation of the number of pixels of the image data that is processed by each element when the imaging device 10 generates the moving image data of the telescopic side will be provided. In the generation of the moving image data of the telescopic side by the imaging device 10, for example, input image data of an area B, which is obtained by cutting out 2 Mpixels of a center part from the entire area A of the effective pixels of the image sensor 100 as illustrated in (a) of FIG. 3, is processed.

The imaging IF unit 200 also outputs the pre-processed image data of 18 Mpixels, which corresponds to the area A subject to the pre-process by the pre-processing section 201, to the second transmission section 203. Then, the second transmission section 203 performs the cut-out process on the pre-processed image data, and records (writes) second image data corresponding to the area B in the DRAM 601 as illustrated in (c) of FIG. 3. In more detail, the second transmission section 203 cuts out the center part of the pre-processed image data of 18 Mpixels, generates the second image data of 2 Mpixels, and records (writes) the second image data in the DRAM 601.

Then, the image processing unit 300 performs the moving image compression process on the second image data (2 Mpixels) subject to the cut-out process by the imaging IF unit 200, generates moving image data (2 Mpixels) of the telescopic side as illustrated in (d) of FIG. 3, and records (writes) the moving image data in the DRAM 601 again.

In more detail, the image processing circuit 302 performs the H.264 moving image compression process on the second image data (2 Mpixels) subject to the cut-out process by the second transmission section 203, generates the moving image data (2 Mpixels) of the telescopic side, and records (writes) the moving image data in the DRAM 601 again. The moving image data (2 Mpixels) of the telescopic side generated as above is displayed on the display device 401 or recorded (preserved) in the recording medium 501 thereafter.

Next, with reference to FIG. 4, a description of a relation of the number of pixels of the image data of each processing step when the number of pixels of the second image data cut out as the second image is smaller than the number of pixels (2 Mpixels) of the moving image data of the telescopic side, which is generated by the imaging device 10, that is, when the main object captured in the first image is smaller, will be provided.

In addition, when the main object captured in the first image is further small, the relation of the number of pixels of the image data that is processed by each element when the imaging device 10 generates the moving image data of the wide angle side is the same as the relation illustrated in FIG. 3. Accordingly, a description related to the generation of the moving image data of the wide angle side by the imaging device 10 with reference to FIG. 4 will be omitted.

Next, a description of the relation of the number of pixels of image data that is processed by each element when the imaging device 10 generates moving image data of the telescopic side in the case in which the main object captured in the first image is smaller will be provided.

In the generation of the moving image data of the telescopic side by the imaging device 10 when the main object captured in the first image is smaller, for example, input image data of an area C, which is obtained by cutting out 1 Mpixels of a center part from an entire area A of effective pixels of the image sensor 100 as illustrated in (a) of FIG. 4, is processed. At this time, the second transmission section 203 performs the cut-out process on the pre-processed image data (18 Mpixels) corresponding to the area A subject to the pre-process by the pre-processing section 201, and records (writes) second image data corresponding in the area C in the DRAM 601 as illustrated in (c) of FIG. 4. In more detail, the second transmission section 203 cuts out the center part of the pre-processed image data of 18 Mpixels, generates the second image data of 1 Mpixels, and records (writes) the second image data in the DRAM 601.

Then, the image processing unit 300 performs the moving image compression process on the second image data (1 Mpixels) subject to the cut-out process by the imaging IF unit 200 while performing an expansion process of the number of pixels (2 Mpixels) of the moving image data of the telescopic side generated by the imaging device 10, generates moving image data (2 Mpixels) of the telescopic side as illustrated in (d) of FIG. 4, and records (writes) the moving image data in the DRAM 601 again. In more detail, the image processing circuit 302 performs an expansion process of converting the second image data (1 Mpixels) subject to the cut-out process by the second transmission section 203 to the second image data of 2 Mpixels. Then, the image processing circuit 302 performs the H.264 moving image compression process on the second image data (2 Mpixels) subject to the expansion process, generates the moving image data (2 Mpixels) of the telescopic side, and records (writes) the moving image data in the DRAM 601 again. The moving image data (2 Mpixels) of the telescopic side generated as above is displayed on the display device 401 or recorded (preserved) in the recording medium 501 thereafter.

Next, with reference to FIG. 5, a description of the relation of the number of pixels of the image data of each processing step when the number of pixels of the second image data cut out as the second image is larger than the number of pixels (2 Mpixels) of the moving image data of the telescopic side, which is generated by the imaging device 10, that is, when the main object captured in the first image is large, will be provided. First, a description of the relation of the number of pixels of the image data that is processed by each element when the imaging device 10 generates the moving image data of the wide angle side in the case in which the main object captured in the first image is larger will be provided.

In the generation of the moving image data of the wide angle side by the imaging device 10 when the main object captured in the first image is larger, when input image data (18 Mpixels) of an entire area A of effective pixels of the image sensor 100 as illustrated in (a) of FIG. 5 is output to the imaging IF unit 200, the image sensor 100 is driven in the pixel addition mode in which pixel signals are added for output. In addition, a change (setting) of the operating mode of the image sensor 100 to the pixel addition mode is performed by the CPU 700 before the image sensor 100 outputs the input image data. In this way, the image sensor 100 performs the pixel addition, and outputs input image data having the number of pixels reduced from 18 Mpixels to the imaging IF unit 200) as illustrated in (b) of FIG. 5. In more detail, the image sensor 100 performs the pixel addition for reducing the horizontal length of the input image data (18 Mpixels) by ½ and reducing the vertical length by ½, and outputs input image data changed to 4.5 Mpixels to the imaging IF unit 200. In addition, even in this case, there is no change in the size of the pixel area captured by the image sensor 100.

Then, the imaging IF unit 200 allows the pre-processing section 201 to perform a pre-process on the input image data (4.5 Mpixels) input from the image sensor 100, and outputs the pre-processed image data (4.5 Mpixels) to the first transmission section 202. Then, the first transmission section 202 performs the horizontal vertical resizing process on the pre-processed image data, and records (writes) first image data, the number of pixels of which has changed, in the DRAM 601 as illustrated in (c) of FIG. 5. In more detail, the first transmission section 202 performs the horizontal vertical resizing process of reducing the horizontal length of the pre-processed image data of 4.5 Mpixels by 1/1.5 and reducing the vertical length by 1/1.5, changes the pre-processed image data to the first image data of 2 Mpixels, and records (writes) the first image data in the DRAM 601.

Then, the image processing unit 300 performs the moving image compression process on the first image data (2 Mpixels) subject to the horizontal vertical resizing process by the imaging IF unit 200, generates moving image data (2 Mpixels) of the wide angle side as illustrated in (d) of FIG. 5, and records (writes) the moving image data in the DRAM 601 again. In more detail, the image processing circuit 301 performs the H.264 moving image compression process on the first image data (2 Mpixels) subject to the horizontal vertical resizing process by the first transmission section 202, generates the moving image data (2 Mpixels) of the wide angle side, and records (writes) the moving image data in the DRAM 601 again. The moving image data (2 Mpixels) of the wide angle side generated as above is displayed on the display device 401 or recorded (preserved) in the recording medium 501 thereafter.

Subsequently, a description of the relation of the number of pixels of image data that is processed by each element when the imaging device 10 generates moving image data of the telescopic side in the case in which the main object captured in the first image is larger will be provided.

In the generation of the moving image data of the telescopic side by the imaging device 10 when the main object captured in the first image is large, for example, input image data of an area D, which is obtained by cutting out 6 Mpixels of a center part from the entire area A of the effective pixels of the image sensor 100 as illustrated in (a) of FIG. 5, is processed. In addition, since the imaging IF unit 200 receives the input image data having the reduced number of pixels (4.5 Mpixels) through the pixel signal addition by the image sensor 100, the imaging IF unit 200 performs a process on the input image data of an area subject to the pixel addition, which corresponds to the area D (6 Mpixels) that is cut out by the image sensor 100. Accordingly, the second transmission section 203 performs the cut-out process on the pre-processed image data (4.5 Mpixels) corresponding to the area A subject to the pre-process by the pre-processing section 201, and records (writes) second image data (1.5 Mpixels) corresponding to the area D in the DRAM 601 as illustrated in (c) of FIG. 5. In more detail, the second transmission section 203 cuts out an area, which corresponds to an area obtained by reducing the area D to ½ in the horizontal direction and the vertical direction, from the center part of the pre-processed image data of 4.5 Mpixels, generates the second image data of 1.5 Mpixels, and records (writes) the second image data in the DRAM 601.

Then, the image processing unit 300 performs the moving image compression process on the second image data (1.5 Mpixels) subject to the cut-out process by the imaging IF unit 200 while performing an expansion process of the number of pixels (2 Mpixels) of the moving image data of the telescopic side generated by the imaging device 10, generates moving image data (2 Mpixels) of the telescopic side as illustrated in (d) of FIG. 5, and records (writes) the moving image data in the DRAM 601 again. In more detail, the image processing circuit 302 performs an expansion process of converting the second image data (1.5 Mpixels) subject to the cut-out process by the second transmission section 203 to the second image data of 2 Mpixels. Then, the image processing circuit 302 performs the H.264 moving image compression process on the second image data (2 Mpixels) subject to the expansion process, generates the moving image data (2 Mpixels) of the telescopic side, and records (writes) the moving image data in the DRAM 601 again. The moving image data (2 Mpixels) of the telescopic side generated as above is displayed on the display device 401 or recorded (preserved) in the recording medium 501 thereafter.

As described above, the imaging device 10 changes the operating mode of the image sensor 100 in response to the number of pixels of the second image data that is cut out as the second image. In this way, even when the main object captured in the first image is larger, that is, even when the number of pixels of the second image data cut out as the second image is larger, it is possible to reduce the number of pixels for which image processing is actually performed.

In addition, the case in which the operating mode of the image sensor 100 is always changed, that is, the image sensor 100 is always driven in the pixel addition mode regardless of the number of pixels of the second image data cut out as the second image, is also considered. However, in this case, even when the number of pixels of the second image data is smaller than the number (2 Mpixels) of pixels of the moving image data of the telescopic side generated by the imaging device 10, that is, even when the main object captured in the first image is smaller, the number of pixels of the input image data is reduced by the image sensor 100. Therefore, the moving image data of the telescopic side is generated based on the second image data cut out from the input image data having the reduced number of pixels, resulting in the deterioration of the image quality of the second image. For this reason, when the number of pixels of the second image data cut out as the second image is equal to or smaller than the number of pixels of the moving image data of the telescopic side generated by the imaging device 10, it is advantageous in terms of image quality to maintain the operating mode of the image sensor 100 without changing it.

In addition, when the main object captured in the first image is larger, it is possible to drive the image sensor 100 similarly to the case in which the number of pixels of the second image data illustrated in FIG. 3 is equal to the number of pixels of the moving image data of the telescopic side or the case in which the number of pixels of the second image data illustrated in FIG. 4 is smaller than the number of pixels of the moving image data of the telescopic side. That is, even when the number of pixels of the second image data cut out as the second image is larger than the number of pixels of the moving image data of the telescopic side generated by the imaging device 10, it is possible to drive the image sensor 100 in the still mode without a change in the operating mode of the image sensor 100, and to generate the moving image data of the telescopic side from the input image data (18 Mpixels) of the entire area A of the effective pixels of the image sensor 100.

However, when the main object captured in the first image is larger, it is preferable to change the operating mode of the image sensor 100 to the pixel addition mode and to generate the moving image data of the telescopic side as described above. This is because the function of changing the size of the pixel area, which is provided in the second transmission section 203, is only the cut-out processing function, the number of pixels of the second image data to be recorded (written) in the DRAM 601 through the cut-out process of the second transmission section 203 may become large, and the processing load of the image processing circuit 302, which performs subsequent image processing, may increase. In this regard, it is advantageous in terms of the processing load of the image processing circuit 302 to change the operating mode of the image sensor 100 to the pixel addition mode and to reduce the number of pixels of the second image data to be recorded (written) in the DRAM 601 through the cut-out process of the second transmission section 203 as illustrated in (b) of FIG. 5 because there is no increase in load when performing the image processing.

Hereinafter, a description of the relation of the number of pixels of image data of each processing step when there is no change in the operating mode of the image sensor 100, that is, when the image sensor 100 is driven in the still mode in the case in which the main object captured in the first image is larger, will be provided. First, a description of the relation of the number of pixels of image data that is processed by each element when the imaging device 10 generates the moving image data of the wide angle side will be provided.

In the generation of the moving image data of the wide angle side by the imaging device 10 when the main object captured in the first image is larger, the image sensor 100 is driven in the still mode in which all pixel signals are output and input image data (18 Mpixels) of an entire area A of effective pixels of the image sensor 100 as illustrated in (e) of FIG. 5 is output to the imaging IF unit 200 (refer to (f) of FIG. 5). In addition, the area A in the image sensor 100 illustrated in (c) of FIG. 5 is the same as the area A in the image sensor 100 illustrated in (a) of FIG. 5.

Then, the imaging IF unit 200 allows the pre-processing section 201 to perform a pre-process on the input image data (18 Mpixels) input from the image sensor 100, and outputs the pre-processed image data (18 Mpixels) to the first transmission section 202. Then, the first transmission section 202 performs the horizontal vertical resizing process of reducing the horizontal length of the pre-processed image data of 18 Mpixels by ⅓ and reducing the vertical length thereof by ⅓, generates first image data (2 Mpixels) having a reduced number of pixels as illustrated in (g) of FIG. 5, and records (writes) the first image data in the DRAM 601.

Then, in the image processing unit 300, the image processing circuit 301 performs the H.264 moving image compression process on the first image data (2 Mpixels) subject to the horizontal vertical resizing process by the first transmission section 202, generates moving image data (2 Mpixels) of the wide angle side as illustrated in (h) of FIG. 5, and records (writes) the moving image data in the DRAM 601 again.

Subsequently, a description of the relation of the number of pixels of image data that is processed by each element when the imaging device 10 generates moving image data of the telescopic side in the case in which the main object captured in the first image is larger will be provided. Also in the generation of the moving image data of the telescopic side by the imaging device 10, input image data of an area D, which is the same as the area D illustrated in (a) of FIG. 5 and for example, is obtained by cutting out 6 Mpixels of a center part, is processed.

In the imaging IF unit 200, the second transmission section 203 performs the cut-out process of a center part of pre-processed image data of 18 Mpixels, generates second image data (6 Mpixels) corresponding to the area D as illustrated in (g) of FIG. 5, and records (writes) the second image data in the DRAM 601.

Then, the image processing unit 300 performs the moving image compression process on the second image data (6 Mpixels) subject to the cut-out process by the imaging IF unit 200 while performing a reduction process of the number of pixels (2 Mpixels) of the moving image data of the telescopic side generated by the imaging device 10, generates moving image data (2 Mpixels) of the telescopic side as illustrated in (h) of FIG. 5, and records (writes) the moving image data in the DRAM 601 again. In more detail, the image processing circuit 302 performs a reduction process of converting the second image data (6 Mpixels) subject to the cut-out process by the second transmission section 203 to the second image data of 2 Mpixels. Then, the image processing circuit 302 performs the H.264 moving image compression process on the second image data (2 Mpixels) subject to the reduction process, generates the moving image data (2 Mpixels) of the telescopic side, and records (writes) the moving image data in the DRAM 601 again.

As described above, in the imaging device 10, the operating mode of the image sensor 100 is changed to the pixel addition mode, and the image processing circuit 302 performs the reduction process instead of the reduction of the input image data by the image sensor 100, so that it is possible to generate the same moving image data (2 Mpixels) of the telescopic side.

However, when (c) of FIG. 5 is compared with (g) of FIG. 5, the number of pixels of the second image data processed by the image processing circuit 302 is large in (g) of FIG. 5, that is, when the moving image data of the telescopic side is generated without a change in the operating mode of the image sensor 100. This represents that the processing load of the image processing circuit 302 increases and the amount of the second image data transmitted to the DRAM 601 through DRAM access via the data bus 900 of the imaging device 10 is large. In more detail, when the second image data (1.5 Mpixels) recorded (written) in the DRAM 601 by the second transmission section 203 is added to the second image data (1.5 Mpixels) acquired (read) from the DRAM 601 by the image processing circuit 302, 3 Mpixels are obtained in the case in which the operating mode of the image sensor 100 has changed. On the other hand, in the case in which there is no change in the operating mode of the image sensor 100, when the written second image data (6 Mpixels) is added to the read second image data (6 Mpixels), 12 Mpixels are obtained. As described above, the amount of the second image data is large, resulting in the problems of the reduction of a continuous shooting interval in the imaging device 10, frame missing of moving image capturing, an increase in power consumption, and the like. Accordingly, when the main object captured in the first image is larger, it is advantageous in terms of the processing load of the image processing circuit 302 and the performance of the imaging device 10 to process the relations illustrated in (a) of FIG. 5 to (d) of FIG. 5 in which the moving image data of the telescopic side is generated by changing the operating mode of the image sensor 100, more than the processing of the relations illustrated in (e) of FIG. 5 to (h) of FIG. 5 in which the moving image data of the telescopic side is generated without a change in the operating mode of the image sensor 100. That is, the moving image data of the telescopic side is generated by changing the operating mode of the image sensor 100, so that it is possible to suppress the deterioration of the performance of the imaging device 10 such as the reduction of a continuous shooting interval in the imaging device 10, frame missing of moving image capturing, an increase in power consumption, and the like.

As described above, in the imaging device 10, when the number of pixels of the second image data cut out as the second image is larger, the operating mode of the image sensor 100 is changed, so that it is possible to generate the second image in an advantageous state in terms of the processing load of the image processing circuit 302 and the performance of the imaging device 10. However, as described above, when considering the case in which the number of pixels of the second image data cut out as the second image is equal to or smaller than the number of pixels of the moving image data of the telescopic side generated by the imaging device 10, if the operating mode of the image sensor 100 is changed to the pixel addition mode, it may be disadvantageous in terms of image quality. For this reason, in the imaging device 10 of the first embodiment, an example in which the operating mode of the image sensor 100 is changed to the pixel addition mode when the number of pixels of the second image data cut out as the second image is larger than the number of pixels of the moving image data of the telescopic side generated by the imaging device 10 has been described. However, it is preferable for a threshold value of the number of pixels of the second image data for determining to change the operating mode of the image sensor 100 to be decided in consideration of the standpoints of the processing load, the performance, and the image quality.

Accordingly, the imaging device 10 is not limited only to the configuration in which the determination criteria described in this time have been applied. For example, it may be possible to employ a configuration in which when the number of pixels of the second image data cut out as the second image is equal to or more than a predetermined number of pixels, it is determined to change the operating mode of the image sensor 100 to the pixel addition mode.

As described above, in the imaging device 10 of the first embodiment, in the case of simultaneously capturing the first image and the second image, an operating mode for reading input image data from the image sensor 100 is changed in response to the size of the main object captured in the first image. In more detail, when the main object captured in the first image is larger, the operating mode of the image sensor 100 is changed from the still mode to the pixel addition mode. Meanwhile, in the conventional imaging device, depending on the size of the main object, particularly, when the main object captured in the first image is large, since the number of pixels of a second image, which is cut out from a first image and is subject to image processing, increases, a load of image data transmission and image processing may become large. However, in the imaging device 10 of the first embodiment, even when the main object captured in the first image is large, it is possible to suppress an increase in the number of pixels of the second image that is cut out from the first image and is subject to the image processing, and to reduce the load of the image data transmission and the image processing. Consequently, in the imaging device 10 of the first embodiment, it is possible to simultaneously capture the first image and the second image without extending the processing time of the image processing.

(Second Embodiment)

Next, an imaging device of the second embodiment will be described. The imaging device of the second embodiment shows a difference only in the image sensor 100 and the imaging IF unit 200 provided in the imaging device 10 of the first embodiment illustrated in FIG. 1. Accordingly, in a description of the imaging device of the second embodiment, only elements and operations different from those of the imaging device 10 of the first embodiment will be described, and a detailed description of the same elements and operations equivalent to those of the imaging device 10 of the first embodiment will be omitted here. In addition, in the following description, the imaging device of the second embodiment will be referred to as an imaging device 20, an image sensor different from the image sensor 100 provided in the imaging device 10 of the first embodiment will be referred to as an image sensor 110, and an imaging IF unit different from the imaging IF unit 200 provided in the imaging device 10 of the first embodiment will be referred to as an imaging IF unit 210. Furthermore, the same reference numerals are used to designate the same elements provided in the imaging device 20 as those of the imaging device 10 of the first embodiment.

Figure 6:
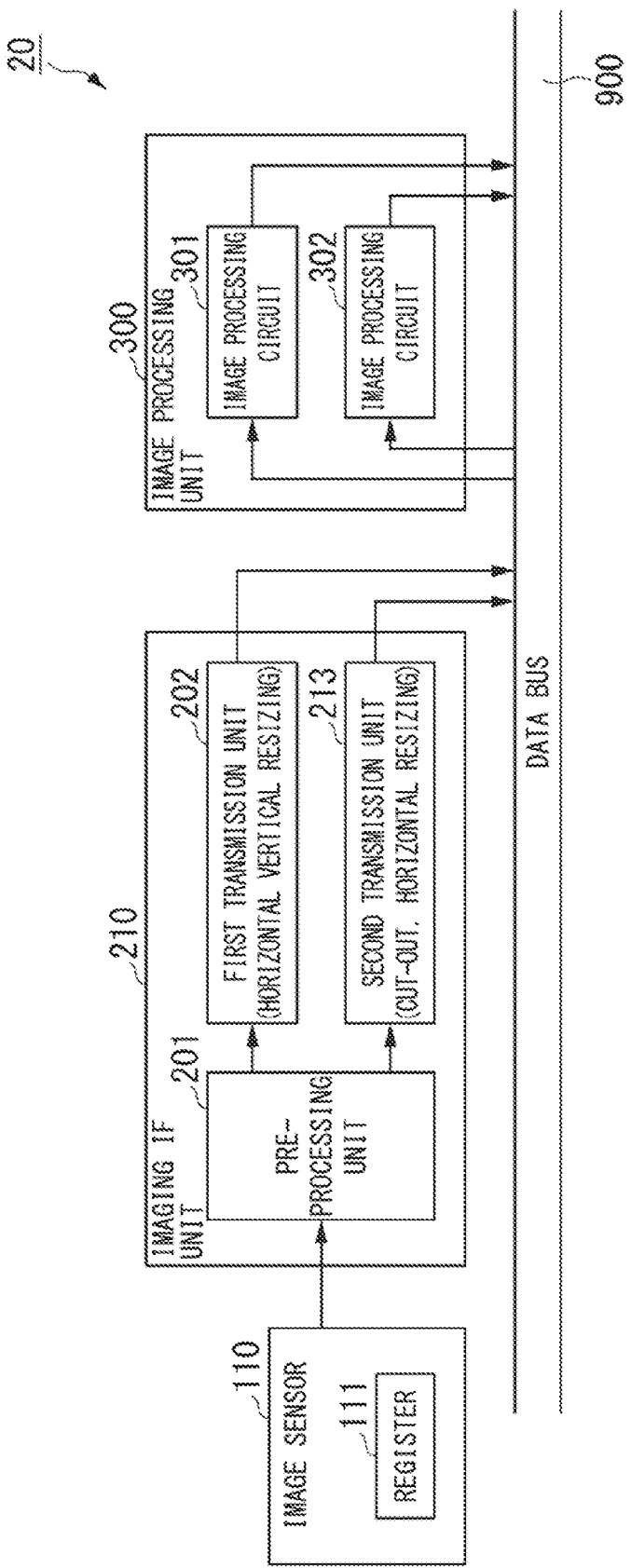
FIG. 6 is a block diagram illustrating a schematic configuration of elements related to the generation of images having pixel areas with different sizes in an imaging device of a second embodiment of the present invention.

Hereinafter, in the imaging device 20, a configuration related to simultaneous capturing of the first image and the second image will be described, similarly to the imaging device 10 of the first embodiment. FIG. 6 is a block diagram illustrating a schematic configuration of elements related to the generation of images having different pixel areas in the imaging device 20 of the second embodiment. FIG. 6 illustrates elements of the image sensor 110, the imaging IF unit 210, and an image processing unit 300, and a data bus 900, which relate to an operation for simultaneously capturing the first image and the second image in the imaging device 20.

The image sensor 110 performs photoelectric conversion for an optical image of an object, which has been formed by a zoom lens (not illustrated), and outputs a pixel signal corresponding to object light to the imaging IF unit 210 as input image data, similarly to the image sensor 100 provided in the imaging device 10 of the first embodiment.

The image sensor 110 sets a register 111 provided in the image sensor 110, thereby driving a plurality of operating modes such as a still mode in which all pixel signals are output, or an operating mode (hereinafter referred to as a "line addition mode") in which pixel signals are added or thinned in each line and are output. The operating modes are set in the register 111 by a CPU 700, so that it is possible to change the operating mode of the image sensor 110, similarly to the image sensor 100 provided in the imaging device 10 of the first embodiment.

In addition, a configuration of changing the operating mode of the image sensor 110 is not limited only to the configuration using the register 111 illustrated in FIG. 6. For example, various configurations, such as a change in the operating mode in response to the states of input terminals of the image sensor 110, are considered. Furthermore, similarly to the image sensor 100 provided in the imaging device 10 of the first embodiment, the image sensor 110 may be driven in the pixel addition mode in which pixel signals are added to every predetermined number of pixels and only the added pixel signals are output.

The imaging IF unit 210 receives input image data input from the image sensor 110, and transmits (writes) resultant image data subject to processes, such as a pre-process, a resizing process, or a cut-out process, to (in) the DRAM 601, similarly to the imaging IF unit 200 provided in the imaging device 10 of the first embodiment. The imaging IF unit 210 includes a pre-processing section 201, a first transmission section 202, and a second transmission section 213.

Since the pre-processing section 201 and the first transmission section 202 are the same as the pre-processing section 201 and the first transmission section 202 of the imaging IF unit 200 provided in the imaging device 10 of the first embodiment, a description thereof will be omitted here.

The second transmission section 213 transmits (writes) resultant image data, which has been obtained by performing a process for changing the size of a pixel area such as a resizing process or a cut-out process on the pre-processed image data input from the pre-processing section 201, to (in) the DRAM 601, similarly to the second transmission section 203 of the imaging IF unit 200 provided in the imaging device 10 of the first embodiment. As illustrated in FIG. 6, the second transmission section 213 has a "cut-out processing function" and a "horizontal resizing processing function" as the processing function of changing the size of the pixel area.

In addition, when the imaging device 20 simultaneously captures the first image and the second image, the imaging IF unit 210 transmits (writes) first image data and second image data to (in) the DRAM 601, similarly to the imaging IF unit 200 provided in the imaging device 10 of the first embodiment, wherein the first image data is obtained by performing the horizontal vertical resizing process on the pre-processed image data by the first transmission section 202, and the second image data is obtained by performing the horizontal resizing process on the pre-processed image data by the second transmission section 213. In addition, a detailed description related to the processes of changing the size of the pixel area, which are performed by the first transmission section 202 and the second transmission section 213, will be given later.

Next, a description of the operation in which the imaging device 20 simultaneously captures the first image and the second image will be provided. In addition, since a procedure for capturing a moving image in the imaging device 20 is able to be performed in the same manner by replacing operations of corresponding respective elements in the procedure for capturing a moving image in the imaging device 10 of the first embodiment, a description thereof will be omitted here.

Hereinafter, operations of respective elements when the imaging device 20 simultaneously captures the first image and the second image will be described focusing on the number of pixels of image data that is processed by the respective elements. The operations of the respective elements provided in the imaging device 20 differ according to the size of the pixel area of the second image corresponding to the size of a main object, that is, the difference in the number of pixels of image data included in the pixel area of the second image that is cut out from the first image, similarly to the operations of the elements provided in the imaging device 10 of the first embodiment.

Figure 7:
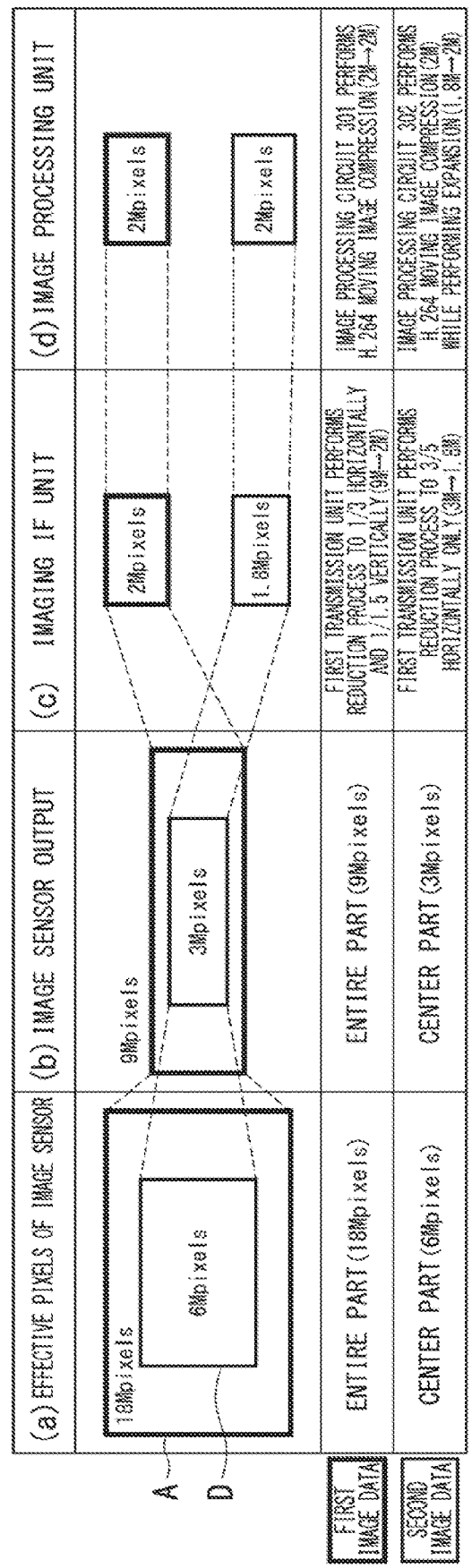
FIG. 7 is a diagram for explaining an example of a relation of the number of pixels of each processing step of generating images having pixel areas with different sizes in an imaging device of a second embodiment.

FIG. 7 is a diagram for explaining an example of a relation of the number of pixels of each processing step of generating images having different pixel areas in the imaging device 20 of the second embodiment. FIG. 7 illustrates a relation of the number of pixels of the image data of each processing step when the number of pixels of the second image data cut out as the second image is larger than the number of pixels of moving image data of the telescopic side, which is generated by the imaging device 20, that is, when the main object captured in the first image is larger. In addition, FIG. 7 is an example in which, when the number of effective pixels of the image sensor 110 is 18 million pixels (18 Mpixels), the imaging device 20 generates moving image data of the wide angle side and moving image data of the telescopic side of 2 million pixels (2 Mpixels) from the input image data of the image sensor 110.

In addition, since the relation of the number of pixels of the image data of each processing step when the number of pixels of the second image data is 2 Mpixels, which is the same as the number of pixels of the moving image data of the telescopic side generated by the imaging device 20, or is smaller than the number (2 Mpixels) of pixels of the moving image data of the telescopic side generated by the imaging device 20 is the same as the relation of the number of pixels of the image data of each processing step in the imaging device 10 of the first embodiment illustrated in FIG. 3 or FIG. 4, a description thereof will be omitted here.

With reference to FIG. 7, a description of the relation of the number of pixels of the image data of each processing step when the main object captured in the first image is larger will be provided. First, a description of the relation of the number of pixels of the image data that is processed by each element when the imaging device 20 generates the moving image data of the wide angle side in the case in which the main object captured in the first image is larger will be provided.

In the generation of the moving image data of the wide angle side by the imaging device 20 when the main object captured in the first image is larger, when input image data (18 Mpixels) of an entire area A of effective pixels of the image sensor 110 as illustrated in (a) of FIG. 7 is output to the imaging IF unit 210, the image sensor 110 is driven in a line addition mode in which pixel signals are added to every predetermined number of lines (line addition) and only the added pixel signals are output or the pixel signals are thinned every predetermined number of lines (line thinning) and only lines remaining through the thinning are output. In addition, a setting of the operating mode of the image sensor 110 to the line addition mode is performed by a CPU 700 before the image sensor 110 outputs the input image data, similarly to the imaging device 10 of the first embodiment. In this way, the image sensor 110 performs the line addition or the line thinning, and outputs input image data having the number of pixels reduced from 18 Mpixels to the imaging IF unit 210 as illustrated in (b) of FIG. 7. In more detail, the image sensor 110 performs the line addition or the line thinning for reducing the vertical length of the input image data (18 Mpixels) to ½, and outputs input image data changed to 9 Mpixels to the imaging IF unit 210. In addition, even in this case, there is no change in the size of the pixel area captured by the image sensor 110.

Then, the imaging IF unit 210 allows the pre-processing section 201 to perform a pre-process on the input image data (9 Mpixels) input from the image sensor 110, and outputs the pre-processed image data (9 Mpixels) to the first transmission section 202. Then, the first transmission section 202 performs the horizontal vertical resizing process on the pre-processed image data, and records (writes) first image data, the number of pixels of which has changed, in the DRAM 601 as illustrated in (c) of FIG. 7. In more detail, the first transmission section 202 performs the horizontal vertical resizing process of reducing the horizontal length of the pre-processed image data of 9 Mpixels by ⅓ and reducing the vertical length thereof by 1/1.5, changes the pre-processed image data to the first image data of 2 Mpixels, and records (writes) the first image data in the DRAM 601.

Then, the image processing unit 300 performs the moving image compression process on the first image data (2 Mpixels) subject to the horizontal vertical resizing process by the imaging IF unit 210, generates moving image data (2 Mpixels) of the wide angle side as illustrated in (d) of FIG. 7, and records (writes) the moving image data in the DRAM 601 again. In more detail, the image processing circuit 301 performs the H.264 moving image compression process on the first image data (2 Mpixels) subject to the horizontal vertical resizing process by the first transmission section 202, generates the moving image data (2 Mpixels) of the wide angle side, and records (writes) the moving image data in the DRAM 601 again. The moving image data (2 Mpixels) of the wide angle side generated as above is displayed on the display device 401 or recorded (preserved) in the recording medium 501 thereafter.

Next, a description of the relation of the number of pixels of image data that is processed by each element when the imaging device 20 generates moving image data of the telescopic side in the case in which the main object captured in the first image is larger will be provided.

In the generation of the moving image data of the telescopic side by the imaging device 20 when the main object captured in the first image is larger, for example, input image data of an area D, which is obtained by cutting out 6 Mpixels of a center part from an entire area A of effective pixels of the image sensor 110 as illustrated in (a) of FIG. 7, is processed. In addition, since the imaging IF unit 210 receives the input image data having the reduced number of pixels (9 Mpixels) through the line addition or the line thinning by the image sensor 110, the imaging IF unit 210 performs a process on the input image data of an area subject to the line addition or the line thinning, which corresponds to an area D (6 Mpixels) that is cut out by the image sensor 110. Accordingly, the second transmission section 213 performs the cut-out process and the horizontal resizing process on the pre-processed image data (9 Mpixels) corresponding to the area A subject to the pre-process by the pre-processing section 201, and records (writes) second image data (1.8 Mpixels) corresponding to the area D in the DRAM 601 as illustrated in (c) of FIG. 7. In more detail, the second transmission section 213 cuts out an area of 3 Mpixels, which is obtained by reducing the area D to ½ through the line addition or the line thinning in the vertical direction, from the center part of the pre-processed image data of 9 Mpixels, further performs the horizontal resizing process of reducing the area D to ⅗ only in the horizontal direction, changes the pre-processed image data to the second image data of 1.8 Mpixels, and records (writes) the second image data in the DRAM 601.

Then, the image processing unit 300 performs the moving image compression process on the second image data (1.8 Mpixels) subject to the horizontal resizing process by the imaging IF unit 210 while performing an expansion process of the number of pixels (2 Mpixels) of the moving image data of the telescopic side generated by the imaging device 20, generates moving image data (2 Mpixels) of the telescopic side as illustrated in (d) of FIG. 7, and records (writes) the moving image data in the DRAM 601 again. In more detail, the image processing circuit 302 performs an expansion process of converting the second image data (1.8 Mpixels) subject to the cut-out process by the second transmission section 213 to the second image data of 2 Mpixels. Then, the image processing circuit 302 performs the H.264 moving image compression process on the second image data (2 Mpixels) subject to the expansion process, generates the moving image data (2 Mpixels) of the telescopic side, and records (writes) the moving image data in the DRAM 601 again. The moving image data (2 Mpixels) of the telescopic side generated as above is displayed on the display device 401 or recorded (preserved) in the recording medium 501 thereafter.

As described above, similarly to the imaging device 10 of the first embodiment, also in the imaging device 20 of the second embodiment, in the case of simultaneously capturing the first image and the second image, an operating mode for reading input image data from the image sensor 110 is changed in response to the size of the main object captured in the first image. In more detail, when the main object captured in the first image is larger, the operating mode of the image sensor 110 is changed from the still mode to the line addition mode. In this way, similarly to the imaging device 10 of the first embodiment, also in the imaging device 20 of the second embodiment, even when the main object captured in the first image is large, it is possible to suppress an increase in the number of pixels of the second image that is cut out from the first image and is subject to the image processing, and to reduce the load of the image data transmission and the image processing. Consequently, in the imaging device 20 of the second embodiment, it is possible to simultaneously capture the first image and the second image without extending the processing time of the image processing.

Furthermore, in the imaging device 20 of the second embodiment, the second transmission section 213 of the imaging IF unit 210 has the horizontal resizing processing function. Furthermore, in the imaging device 10 of the first embodiment, the image sensor 100 is driven in the pixel addition mode to reduce the input image data in the horizontal direction and the vertical direction. On the other hand, in the imaging device 20 of the second embodiment, the image sensor 110 reduces the input image data in the vertical direction and the second transmission section 213 of the imaging IF unit 210 reduces the input image data in the horizontal direction, thereby generating the first image data and the second image data. In this way, in the imaging device 20 of the second embodiment, it is possible to improve the image quality in the horizontal direction of the first image and the second image, which are simultaneously captured, while obtaining the same effect as that of the imaging device 10 of the second embodiment.

In addition, in the imaging device 20 of the second embodiment, the configuration in which the image sensor 110 reduces the input image data in the vertical direction and the second transmission section 213 of the imaging IF unit 210 reduces the input image data in the horizontal direction has been described. However, it may be possible to employ a configuration in which the image sensor 110 reduces the input image data in the horizontal direction and the second transmission section 213 of the imaging IF unit 210 reduces the input image data in the vertical direction.

However, in general, a resizing circuit of the horizontal direction is smaller than a resizing circuit of the vertical direction. Therefore, as with the imaging device 20 of the second embodiment, when the configuration in which the image sensor 110 reduces the input image data in the vertical direction and the second transmission section 213 of the imaging IF unit 210 reduces the input image data in the horizontal direction is employed, the image quality in the horizontal direction of the first image and the second image is improved and it is possible to suppress an increase in the circuit size of the imaging IF unit 210.

(Third Embodiment)

Next, an imaging device of the third embodiment will be described. The imaging device of the third embodiment shows a difference only in the imaging IF unit 200 provided in the imaging device 10 of the first embodiment illustrated in FIG. 1. Accordingly, in a description of the imaging device of the third embodiment, only elements and operations different from those of the imaging device 10 of the first embodiment will be described, and a detailed description of the same elements and operations equivalent to those of the imaging device 10 of the first embodiment will be omitted here. In addition, in the following description, the imaging device of the third embodiment will be referred to as an imaging device 30, and an imaging IF unit different from the imaging IF unit 200 provided in the imaging device 10 of the first embodiment will be referred to as an imaging IF unit 220. Furthermore, the same reference numerals are used to designate the same elements provided in the imaging device 30 as those of the imaging device 10 of the first embodiment.

Figure 8:
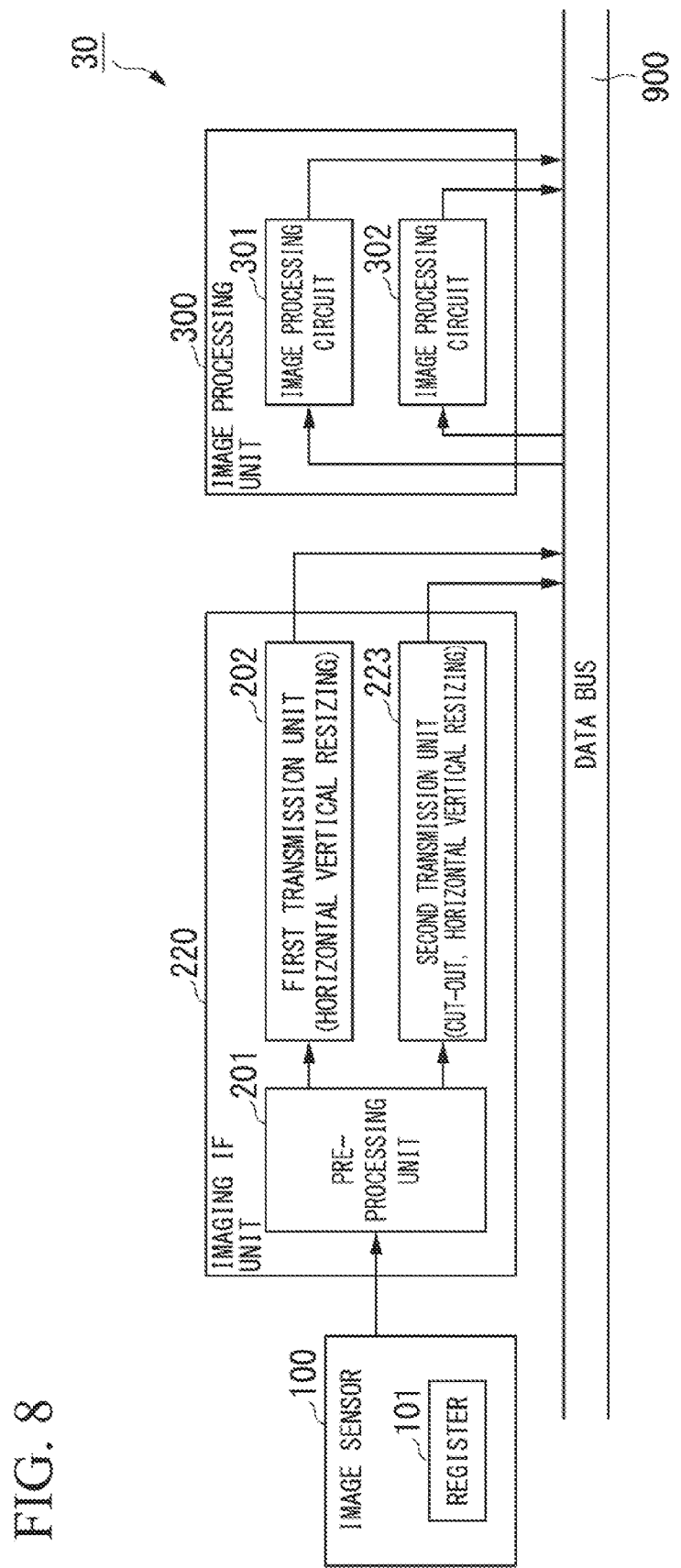
FIG. 8 is a block diagram illustrating a schematic configuration of elements related to the generation of images having pixel areas with different sizes in an imaging device of a third embodiment of the present invention.

Hereinafter, in the imaging device 30, a configuration related to simultaneous capturing of the first image and the second image will be described, similarly to the imaging device 10 of the first embodiment. FIG. 8 is a block diagram illustrating a schematic configuration of elements related to the generation of images having pixel areas with different sizes in the imaging device 30 of the third embodiment. FIG. 8 illustrates elements of an image sensor 100, the imaging IF unit 220, and an image processing unit 300, and a data bus 900, which relate to an operation for simultaneously capturing the first image and the second image in the imaging device 30.

The imaging IF unit 220 receives input image data input from the image sensor 100, and transmits (writes) resultant image data subject to processes, such as a pre-process, a resizing process, or a cut-out process, to (in) the DRAM 601, similarly to the imaging IF unit 200 provided in the imaging device 10 of the first embodiment. The imaging IF unit 220 includes a pre-processing section 201, a first transmission section 202, and a second transmission section 223.

Since the pre-processing section 201 and the first transmission section 202 are the same as the pre-processing section 201 and the first transmission section 202 of the imaging IF unit 200 provided in the imaging device 10 of the first embodiment, a description thereof will be omitted here.

The second transmission section 223 transmits (writes) resultant image data, which has been obtained by performing a process for changing the size of a pixel area such as a resizing process or a cut-out process on the pre-processed image data input from the pre-processing section 201, to (in) the DRAM 601, similarly to the second transmission section 203 of the imaging IF unit 200 provided in the imaging device 10 of the first embodiment. As illustrated in FIG. 8, the second transmission section 223 has a "cut-out processing function" and a "horizontal vertical resizing processing function" as the processing function of changing the size of the pixel area. In addition, the horizontal vertical resizing processing function is the same as the horizontal vertical resizing processing function of the first transmission section 202.

In addition, when the imaging device 30 simultaneously captures the first image and the second image, the imaging IF unit 220 transmits (writes) first image data and second image data to (in) the DRAM 601, similarly to the imaging IF unit 200 provided in the imaging device 10 of the first embodiment, wherein the first image data is obtained by performing the horizontal vertical resizing process on the pre-processed image data by the first transmission section 202, and the second image data is obtained by performing the horizontal vertical resizing process on the pre-processed image data by the second transmission section 223. In addition, a detailed description related to the processes of changing the size of the pixel area, which are performed by the first transmission section 202 and the second transmission section 223, will be given later.

Next, a description of the operation in which the imaging device 30 simultaneously captures the first image and the second image will be provided. In addition, since a procedure for capturing a moving image in the imaging device 30 is able to be performed in the same manner by replacing operations of corresponding respective elements in the procedure for capturing a moving image in the imaging device 10 of the first embodiment, a description thereof will be omitted.

Hereinafter, operations of respective elements when the imaging device 30 simultaneously captures the first image and the second image will be described while focusing on the number of pixels of image data that is processed by the respective elements. The operations of the respective elements provided in the imaging device 30 differ according to the size of the pixel area of the second image corresponding to the size of a main object, that is, the difference in the number of pixels of image data included in the pixel area of the second image that is cut out from the first image, similarly to the operations of the elements provided in the imaging device 10 of the first embodiment.

Figure 9:
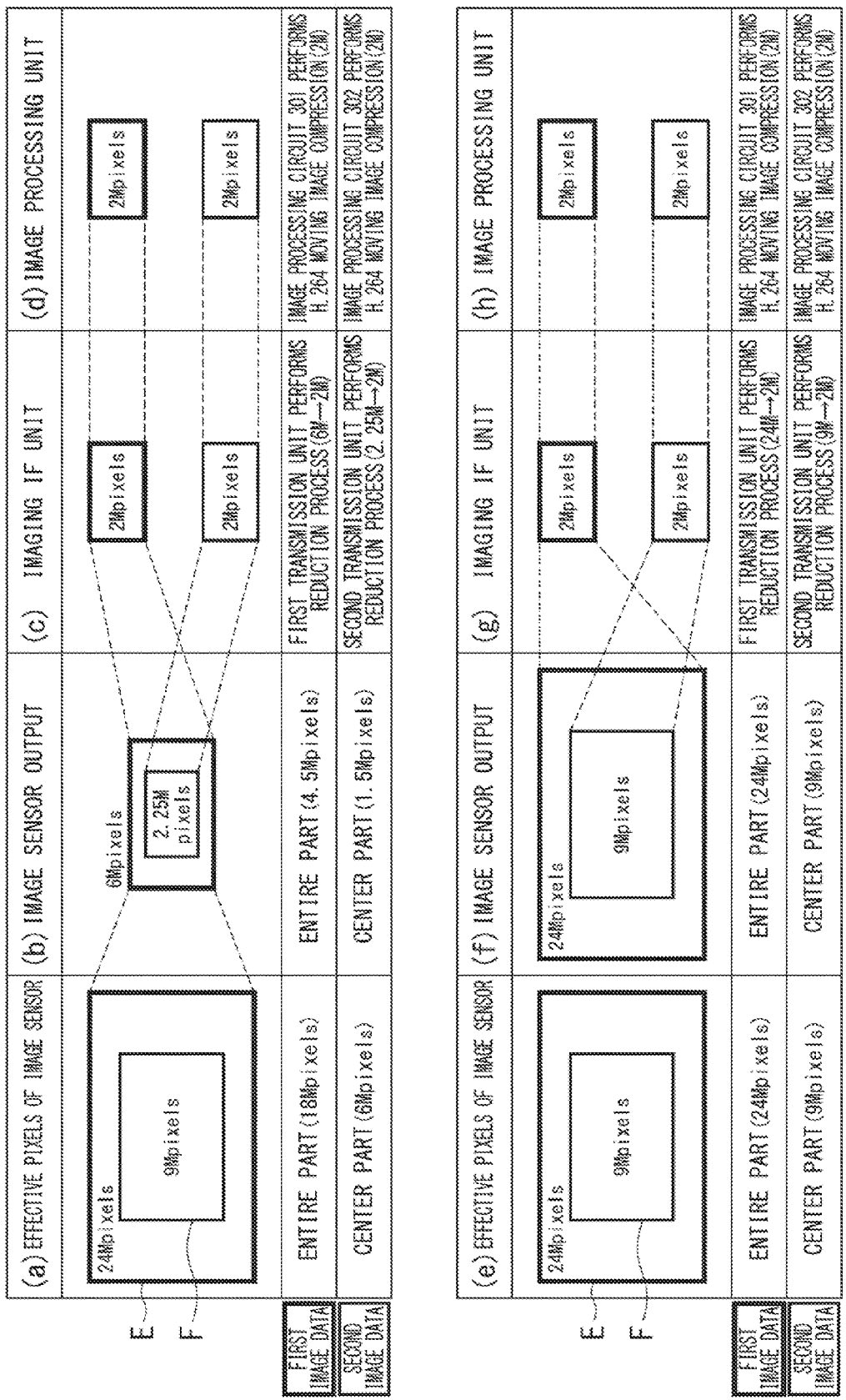
FIG. 9 is a diagram for explaining an example of a relation of the number of pixels of each processing step of generating an image having pixel areas with different sizes in an imaging device of a third embodiment.

FIG. 9 is a diagram for explaining an example of a relation of the number of pixels of each processing step of generating images having different pixel areas in the imaging device 30 of the third embodiment. FIG. 9 illustrates a relation of the number of pixels of the image data of each processing step when the number of pixels of the second image data cut out as the second image is larger than the number of pixels of moving image data of the telescopic side, which is generated by the imaging device 30, that is, when the main object captured in the first image is larger. In addition, FIG. 9 is an example in which, when the number of effective pixels of the image sensor 100 is 24 million pixels (24 Mpixels), the imaging device 30 generates moving image data of the wide angle side and moving image data of the telescopic side of 2 million pixels (2 Mpixels) from the input image data of the image sensor 100.

In addition, since the relation of the number of pixels of the image data of each processing step when the number of pixels of the second image data is 2 Mpixels, which is the same as the number of pixels of the moving image data of the telescopic side generated by the imaging device 30, or is smaller than the number (2 Mpixels) of pixels of the moving image data of the telescopic side generated by the imaging device 30 is the same as the relation of the number of pixels of the image data of each processing step in the imaging device 10 of the first embodiment illustrated in FIG. 3 or FIG. 4, a description thereof will be omitted here.

With reference to FIG. 9, a description of the relation of the number of pixels of the image data of each processing step when the main object captured in the first image is larger will be provided. First, a description of the relation of the number of pixels of the image data that is processed by each element when the imaging device 30 generates the moving image data of the wide angle side in the case in which the main object captured in the first image is large will be provided.

In the generation of the moving image data of the wide angle side by the imaging device 30 when the main object captured in the first image is larger, when input image data (24 Mpixels) of an entire area E of effective pixels of the image sensor 100 as illustrated in (a) of FIG. 9 is output to the imaging IF unit 220, the image sensor 100 is driven in a pixel addition mode in which pixel signals are added to every predetermined number of lines and only the added pixel signals are output. In addition, a change (setting) of the operating mode of the image sensor 110 to the pixel addition mode is performed by a CPU 700 before the image sensor 100 outputs the input image data, similarly to the imaging device 10 of the first embodiment. In this way, the image sensor 100 performs the pixel addition, and outputs input image data having the number of pixels smaller than 24 Mpixels to the imaging IF unit 220 as illustrated in (b) of FIG. 9. In more detail, the image sensor 100 performs the pixel addition for reducing the horizontal length of the input image data (24 Mpixels) by ½ and reducing the vertical length thereof by 1/2, and outputs input image data changed to 6 Mpixels to the imaging IF unit 220. In addition, even in this case, there is no change in the size of the pixel area captured by the image sensor 100.

Then, the imaging IF unit 220 allows the pre-processing section 201 to perform a pre-process on the input image data (6 Mpixels) input from the image sensor 100, and outputs the pre-processed image data (6 Mpixels) to the first transmission section 202. Then, the first transmission section 202 performs the horizontal vertical resizing process on the pre-processed image data, and records (writes) first image data of 2 Mpixels, the number of pixels of which has changed, in the DRAM 601 as illustrated in (c) of FIG. 9.

Then, in the image processing unit 300, an image processing circuit 301 performs the H.264 moving image compression process on the first image data (2 Mpixels) subject to the horizontal vertical resizing process by the first transmission section 202, generates moving image data (2 Mpixels) of the wide angle side as illustrated in (d) of FIG. 9, and records (writes) the moving image data in the DRAM 601 again. The moving image data (2 Mpixels) of the wide angle side generated as above is displayed on the display device 401 or recorded (preserved) in the recording medium 501 thereafter.

Next, a description of the relation of the number of pixels of image data that is processed by each element when the imaging device 30 generates moving image data of the telescopic side in the case in which the main object captured in the first image is larger will be provided.

In the generation of the moving image data of the telescopic side by the imaging device 30 when the main object captured in the first image is large, for example, input image data of an area F, which is obtained by cutting out 9 Mpixels of a center part from the entire area E of the effective pixels of the image sensor 100 as illustrated in (a) of FIG. 9, is processed. In addition, since the imaging IF unit 220 receives the input image data having the reduced number of pixels (6 Mpixels) through the pixel addition by the image sensor 100, the imaging IF unit 220 performs a process on the input image data of an area subject to the pixel addition, which corresponds to an area F (9 Mpixels) that is cut out by the image sensor 100. Accordingly, the second transmission section 223 performs the cut-out process and the horizontal vertical resizing process on the pre-processed image data (6 Mpixels) corresponding to the area E subject to the pre-process by the pre-processing section 201, and records (writes) second image data (2 Mpixels) corresponding to the area F in the DRAM 601 as illustrated in (c) of FIG. 9. In more detail, the second transmission section 223 cuts out an area (2.25 Mpixels), which is obtained by reducing the area F to ½in the horizontal direction and the vertical direction, from the center part of the pre-processed image data of 6 Mpixels, further performs a horizontal vertical resizing process, changes the pre-processed image data to the second image data of 2 Mpixels, and records (writes) the second image data in the DRAM 601.

Then, in the image processing unit 300, an image processing circuit 302 performs the H.264 moving image compression process on the second image data (2 Mpixels) subject to the horizontal vertical resizing process by the second transmission section 223, generates moving image data (2 Mpixels) of the telescopic side as illustrated in (d) of FIG. 9, and records (writes) the moving image data in the DRAM 601 again. The moving image data (2 Mpixels) of the telescopic side generated as above is displayed on the display device 401 or recorded (preserved) in the recording medium 501 thereafter.

In addition, the second transmission section 223 of the imaging IF unit 220 provided in the imaging device 30 of the third embodiment has the "horizontal vertical resizing processing function" as a processing function of changing a pixel area as described above. Therefore, in the imaging device 30 of the third embodiment, in the case in which the main object captured in the first image is larger, it is possible to drive the image sensor 100 similarly to the case in which the number of pixels of the second image data is equal to the number of pixels of the moving image data of the telescopic side or the case in which the number of pixels of the second image data is smaller than the number of pixels of the moving image data of the telescopic side. That is, even when the number of pixels of the second image data cut out as the second image is larger than the number of pixels of the moving image data of the telescopic side generated by the imaging device 30, it is possible to drive the image sensor 100 in the still mode without a change in the operating mode of the image sensor 100, and to generate the moving image data of the telescopic side from the input image data (24 Mpixels) of the entire area E of the effective pixels of the image sensor 100.

In this way, in the imaging device 30 of the third embodiment, it is possible to improve the image quality of the first image and the second image as compared with the first image and the second image generated based on the input image data reduced in the pixel addition mode of the image sensor 100.

Hereinafter, a description of the relation of the number of pixels of image data of each processing step when there is no change in the operating mode of the image sensor 100, that is, when the image sensor 100 is driven in the still mode to generate moving image data in the case in which the main object captured in the first image is large, will be provided. First, a description of the relation of the number of pixels of image data that is processed by each element when the imaging device 30 generates the moving image data of the wide angle side in the case in which the main object captured in the first image is large will be provided.

In the generation of the moving image data of the wide angle side by the imaging device 30 when the main object captured in the first image is larger, the image sensor 100 is driven in the still mode in which all pixel signals are output and input image data (24 Mpixels) of an entire area E of effective pixels of the image sensor 100 as illustrated in (e) of FIG. 9 is output to the imaging IF unit 220 (refer to (f) of FIG. 9). In addition, the area E in the image sensor 100 illustrated in (e) of FIG. 9 is the same as the area E in the image sensor 100 illustrated in (a) of FIG. 9.

Then, the imaging IF unit 220 allows the pre-processing section 201 to perform a pre-process on the input image data (24 Mpixels) input from the image sensor 100, and outputs the pre-processed image data (24 Mpixels) to the first transmission section 202. Then, the first transmission section 202 performs the horizontal vertical resizing process on the pre-processed image data of 24 Mpixels, generates first image data (2 Mpixels) having the reduced number of pixels as illustrated in (g) of FIG. 9, and records (writes) the first image data in the DRAM 601.

Then, in the image processing unit 300, the image processing circuit 301 performs the H.264 moving image compression process on the first image data (2 Mpixels) subject to the horizontal vertical resizing process by the first transmission section 202, generates moving image data (2 Mpixels) of the wide angle side as illustrated in (h) of FIG. 9, and records (writes) the moving image data in the DRAM 601 again.

Next, a description of the relation of the number of pixels of image data that is processed by each element when the imaging device 30 generates moving image data of the telescopic side in the case in which the main object captured in the first image is larger will be provided. Also in the generation of the moving image data of the telescopic side by the imaging device 30, input image data of an area F, which is the same as the area F illustrated in (a) of FIG. 9 and for example, is obtained by cutting out 9 Mpixels of a center part, is processed.

In the imaging IF unit 220, the second transmission section 223 performs the cut-out process and the horizontal vertical resizing process on pre-processed image data of 24 Mpixels, generates second image data (2 Mpixels) corresponding to the area F as illustrated in (g) of FIG. 9, and records (writes) the second image data in the DRAM 601.

Then, in the image processing unit 300, the image processing circuit 302 performs the H.264 moving image compression process on the second image data (2 Mpixels) subject to the horizontal vertical resizing process by the second transmission section 223, generates moving image data (2 Mpixels) of the telescopic side as illustrated in (h) of FIG. 9, and records (writes) the moving image data in the DRAM 601 again.

As described above, in the imaging device 30, the operating mode of the image sensor 100 is changed to the pixel addition mode, and the second transmission section 223 performs the horizontal vertical resizing process instead of the reduction of the input image data by the image sensor 100, so that it is possible to generate the same second image data.

Moreover, when (c) of FIG. 9 is compared with (g) of FIG. 9, the number of pixels of the second image data processed by the image processing circuit 302 is constant regardless of the operating mode of the image sensor 100. Accordingly, in the imaging device 30 of the third embodiment, there is no change in the processing load when the image processing circuit 302 performs the image processing regardless of the operating mode of the image sensor 100.

As described above, in the imaging device 30 of the third embodiment, the second transmission section 223 of the imaging IF unit 220 has the horizontal vertical resizing processing function. Meanwhile, in the imaging device 10 of the first embodiment, when the input image data is reduced in the horizontal direction and the vertical direction, the image sensor 100 is driven in the pixel addition mode. On the other hand, in the imaging device 30 of the third embodiment, even when there is no change in the operating mode of the image sensor 100, the second transmission section 223 of the imaging IF unit 220 reduces the input image data in the horizontal direction and the vertical direction, thereby generating the first image data and the second image data. In this way, in the imaging device 30 of the third embodiment, even when the main object captured in the first image is large, it is possible to suppress an increase in the number of pixels of the second image that is cut out from the first image, and to reduce the load of the image data transmission and the image processing regardless of the operating mode of the image sensor 100. Consequently, in the imaging device 30 of the third embodiment, it is possible to simultaneously capture the first image and the second image without an increase in the processing time of the image processing.

Furthermore, in the imaging device 30 of the third embodiment, the image sensor 100 is driven in the still mode without a change in the operating mode of the image sensor 100, so that it is possible to improve the image quality of the first image and the second image as compared with the first image and the second image generated when the image sensor 100 is driven in the pixel addition mode.

In addition, in the imaging device 30 of the third embodiment, it is advantageous in terms of power consumption of the imaging device 30 to drive the image sensor 100 in the pixel addition mode. That is, when the image sensor 100) is driven in the pixel addition mode, since the image sensor 100 is able to reduce the input image data in the horizontal direction and the vertical direction, the amount of the input image data output from the image sensor 100 is small and it is possible to reduce the processing load between the image sensor 100 and the pre-processing section 201 of the imaging IF unit 220.

Furthermore, using the reduction of the processing load between the image sensor 100 and the pre-processing section 201, it is possible to reduce power consumption of the imaging device 30. For example, when the imaging device 30 generates the first image and the second image in a fixed period, some of LVDS (Low Voltage Differential Signaling) ports, which are output ports of the image sensor 100, are turned OFF to reduce a change in signals between the image sensor 100 and the pre-processing section 201 or to lower a clock rate of the imaging IF unit 220 in a range in which the fixed period is satisfied, so that it is possible to reduce the power consumption of the imaging device 30.

Consequently, in the imaging device 30 of the third embodiment, it is possible to select the operating mode of the image sensor 100 according to whether priority is given to the image quality of each of the generated first image and second image or the reduction of the power consumption of the imaging device 30.

As described above, according to each embodiment for embodying the present invention, in the case of simultaneously capturing a plurality of images (two images of the first image and the second image in the embodiment) having different pixel areas, an optical image of an object is formed on the image sensor in the state in which the zoom lens has been controlled to the wide angle side. Furthermore, according to the embodiment for embodying the present invention, in response to the size of a main object captured in an image of the wide angle side, the operating mode of the image sensor for reading a pixel signal corresponding to object light, an image of which has been formed by the image sensor, is changed. In this way, in each embodiment, particularly, when the main object captured in the image of the wide angle side is large, it is possible to avoid an increase in a load of image data transmission and image processing due to an increase in the number of pixels of image data that is cut out for generating an image of the telescopic side. In this way, in each embodiment, regardless of the size of the main object captured in the image of the wide angle side, it is possible to simultaneously capture a plurality of images having different pixel areas without extending the processing time of image processing for generating the image of the telescopic side. In this way, for example, even in the case of capturing an object moving largely as with a sporting event such as a footrace or a car race such as F1 (Formula One), a photographer (a user) is able to capture the object without losing it and obtain an image in which the object has been largely captured. Furthermore, in the embodiments for embodying the present invention, it is possible to suppress the reduction of a continuous shooting interval due to an increase in a processing load of image data transmission and image processing, frame missing of moving image capturing in moving image capturing, an increase in power consumption, and the like.

Furthermore, according to each embodiment for embodying the present invention, the operating mode of the image sensor for reading a pixel signal corresponding to object light, an image of which has been formed by the image sensor, is changed, so that it is possible to select whether priority is given to the image quality of each of a plurality of generated images having different pixel areas or the reduction of the power consumption of the imaging device.

In addition, since the number of effective pixels of the image sensor 100, the number of pixels or resizing rates of the moving image data of the wide angle side and the moving image data of the telescopic side generated by the first transmission section 202 and the second transmission section 203 of the imaging IF unit 200, and the number of pixels of the moving image data of the wide angle side and the moving image data of the telescopic side generated by the image processing unit 300, which have been described in each embodiment, are an example, the present invention can be embodied for any number of pixels and resizing rate in the same manner without departing from the scope of the present invention. Furthermore, since the position (for example, all of the effective pixels of the image sensor 100) of the area of the wide angle side and the position (for example, a center part) of the area of the telescopic side, which have been described in the present embodiment, are also an example, the present invention can be embodied for any area and position in the same manner without departing from the scope of the present invention.

Furthermore, the case in which the imaging device (10, 20, or 30) of each embodiment simultaneously captures two moving images of different pixel areas has been described. However, even when the imaging device simultaneously captures two still images having pixel areas, the present invention can be embodied in the same manner while maintaining a difference in the number of pixels of each processing step. For example, in the imaging device 10, the number of pixels of the first image data and the second image data, which are output from the first transmission section 202 and the second transmission section 203 of the imaging IF unit 200, and the number of pixels of the first image and the second image for display and the first image and the second image for recording, which are output after image processing for still images by the image processing circuit 301 and the image processing circuit 302 of the image processing unit 300, are employed as the number of pixels corresponding to the still images, so that it is possible to perform the same process as the aforementioned operation when capturing the moving image.

Furthermore, the configuration in which two image processing circuits (the image processing circuit 301 and the image processing circuit 302) are provided in the image processing unit 300 provided in the imaging device (10, 20, or 30) according to each embodiment and each image processing circuit performs image processing on the first image data or the second image data has been described. However, the configurations and the number of the image processing circuits provided in the image processing unit 300 are not limited only to the configurations illustrated in the embodiments for embodying the present invention. For example, it may be possible to employ a configuration in which one image processing circuit is provided in the image processing unit 300 to perform image processing in a time division manner, thereby generating image data for display and image data for recording corresponding to the first image data and the second image data, respectively.

Furthermore, the case in which the imaging device (10, 20, or 30) of each embodiment simultaneously captures two images having pixel areas with different sizes has been described. However, even in the case of simultaneously capturing two or more (for example, three) images having pixel areas with different sizes, the present invention can be embodied in the same manner. For example, an image having the largest pixel area and the other images may be processed as the aforementioned first image and second image, respectively. Furthermore, an image having the smallest pixel area and the other images may be processed as the aforementioned first image and second image, respectively. Furthermore, among these images, any two images may be selected, and between the two selected images, an image having a large pixel area and an image having a small pixel area may be processed as the aforementioned first image and second image, respectively. Any two images, for example, may be an image having the most pixel areas and an image having the second-most pixel areas.

Furthermore, in each embodiment, the configuration in which the imaging device (10, 20, or 30) includes the object detection unit 800, the object detection unit 800 detects the position and the size of a captured main object, and each (particularly, the second transmission section 203) of the first transmission section and the second transmission section changes a pixel area to a pixel area with an appropriate size at an appropriate position using information on the position and the size of the main object detected by the object detection unit 800 has been described. However, the configuration in which each (particularly, the second transmission section 203) of the first transmission section and the second transmission section changes the pixel area is not limited to the configuration of the embodiment. For example, it may be possible to employ a configuration in which, when the display device 401 is a touch panel, a photographer (a user) designates a pixel area of a second area cut out from a first image in the state in which the first image has been displayed on the display device 401.

Furthermore, a program for performing each process of the imaging device (10, 20, or 30) of each embodiment may be recorded in a computer readable recording medium, and may be loaded into and executed by a computer system, so that the aforementioned various processes related to the imaging device (10, 20, or 30) may be performed.

In addition, the "computer system" herein may include an OS or hardware such as a peripheral device. Furthermore, the "computer system" is assumed to include a homepage providing environment (or a display environment) in the case of using a WWW system. Furthermore, the "computer readable recording medium" indicates a portable medium such as a flexible disk, a magneto-optical disc, a ROM, a writable nonvolatile memory such as a flash memory, or a CD-ROM, and a storage unit such as a hard disk embedded in the computer system.

Moreover, the "computer readable recording medium" is assumed to include a medium for holding a program for a constant time as with a volatile memory (for example, DRAM: Dynamic Random Access Memory) in the computer system serving as a server or a client in the case of transmitting the program through a network such as the Internet or a communication line such as a telephone line. Furthermore, the program may be transmitted from the computer system storing the program in a storage device and the like to another computer system through a transmission medium or a transmission wave of the transmission medium. Here, the "transmission medium" for transmitting the program indicates a medium having a function of transmitting information as with a network (a communication network) such as the Internet or a communication line such as a telephone line. Furthermore, the program may include a program for executing a part of the aforementioned functions. Moreover the program may include a program capable of executing the aforementioned functions through a combination of programs recorded in the computer system, or a so-called differential file (a differential program).

In addition, in the present embodiment, the aforementioned processes of the horizontal direction and the vertical direction may be performed in the vertical direction and the horizontal direction, respectively.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device comprising:
a solid-state imaging device which has a plurality of pixels arranged in a two dimensional matrix form, the solid-state imaging device outputting pixel signals corresponding to object light incident on the plurality of pixels in at least two operating modes;
a first conversion section which performs a first conversion process of converting a size of a predetermined first pixel area to a predetermined size with respect to first pixel signals, which are output from first pixels arranged in the first pixel area, within an area of all the plurality of pixels arranged in the solid-state imaging device to output first image data;
a second conversion section which performs a second conversion process of converting a size of a second pixel area to a predetermined size with respect to second pixel signals output from second pixels arranged in the second pixel area, which is smaller than the first pixel area, within the area of all the plurality of pixels arranged in the solid-state imaging device to output second image data;
an operating mode change unit which changes an operating mode of the solid-state imaging device in response to the size of the second pixel area; and
a moving image data generating unit which performs a compression process on the first image data to generate first moving image data and performs the compression process on the second image data to generate second moving image data, wherein,
when the first moving image data and the second moving image data are recorded in a memory at a same time, the operating mode is changed, and
when only one of the first moving image data and the second moving image data is recorded in the memory, the operating mode is unchanged.

2. The imaging device according to claim 1, wherein the first moving image data and the second moving image data are recorded in a memory using a same recording format.

3. The imaging device according to claim 1, wherein the first moving image data and the second moving image data are recorded in a memory so that the number of pixels of the first moving image data is equal to the number of pixels of the second moving image data.

4. The imaging device according to claim 1, wherein
the second pixel area is decided based on a size of a main object included in the first pixel area,
the operating mode change unit drives the solid-state imaging device in a first operating mode in which the pixel signals of all the plurality of pixels included in the solid-state imaging device are output when a number of the second pixels included in the second pixel area is smaller than a predetermined threshold value, and
the operating mode change unit drives the solid-state imaging device in a second operating mode in which pixel signals fewer than the pixel signals output in the first operating mode are output when the number of the second pixels included in the second pixel area is equal to or more than the threshold value.

5. The imaging device according to claim 4, wherein,
in the second operating mode, the pixel signals output from all of the plurality of pixels included in the solid-state imaging device are added or thinned for every predetermined number of pixel signals to generate added pixel signals or remaining pixel signals, and the added pixel signals or the remaining pixel signals after thinning are output.

6. The imaging device according to claim 5, wherein the first conversion process is a process of resizing an area of pixels corresponding to the size of the first pixel area to an area with a predetermined size in a row direction and a column direction, and
the second conversion process is a process of cutting out an area of pixels corresponding to the size of the second pixel area from the area of the pixels corresponding to the size of the first pixel area.

7. The imaging device according to claim 4, wherein, in the second operating mode, the pixel signals output from all of the plurality of pixels included in the solid-state imaging device are added or thinned for every predetermined number of rows or columns to generate added pixel signals or remaining pixel signals, and the added pixel signals or the remaining pixel signals after thinning are output.

8. The imaging device according to claim 7, wherein
the first conversion process is a process of resizing an area of pixels corresponding to the size of the first pixel area to an area with a predetermined size in a row direction and a column direction,
the second conversion process is a process of cutting out an area of pixels corresponding to the size of the second pixel area from the area of the pixels corresponding to the size of the first pixel area, and a process of resizing an area of pixels corresponding to the size of the second pixel area to an area with a predetermined size in the row direction or the column direction, and
the second conversion section performs a process of cutting out the second pixel area and further performs a resizing process in the row direction when the solid-state imaging device reduces the added pixel signals or the remaining pixel signals in the second operating mode in the column direction, and performs a process of cutting out the second pixel area and further performs a resizing process in the column direction when the solid-state imaging device reduces the added pixel signals or the remaining pixel signals in the second operating mode in the row direction.

9. The imaging device according to claim 5, wherein
the first conversion process is a process of resizing an area of pixels corresponding to the size of the first pixel area to an area with a predetermined size in a row direction and a column direction,
the second conversion process is a process of cutting out an area corresponding to the size of the second pixel area from the area of the pixels corresponding to the size of the first pixel area, and a process of resizing an area of pixels corresponding to the size of the second pixel area to an area with a predetermined size in the row direction and the column direction, and
the second conversion section performs a process of cutting out the second pixel area from an area of the pixel signals output from the solid-state imaging device, and further performs a resizing process in the row direction and the column direction.

10. A method for processing an image, comprising:
a first conversion step of performing a first conversion process of converting a size of a predetermined first pixel area to a predetermined size with respect to first pixel signals, which are output from first pixels arranged in the first pixel area, within an area of all of a plurality of pixels arranged in a two dimensional matrix form, and outputting first image data;
a second conversion step of performing a second conversion process of converting a size of a second pixel area to a predetermined size with respect to second pixel signals output from second pixels arranged in the second pixel area, which is smaller than the first pixel area, within the area of all the plurality of pixels, and outputting second image data;
an operating mode change step of changing an operating mode, in which pixel signals are output from the pixels, in response to the size of the second pixel area, and
a moving image data generating unit which performs a compression process on the first image data to generate first moving image data and performs the compression process on the second image data to generate second moving image data, wherein,
when the first moving image data and the second moving image data are recorded in a memory at a same time, the operating mode is changed, and
when only one of the first moving image data and the second moving image data is recorded in the memory, the operating mode is unchanged.

11. A non-transitory computer-readable storage medium with an executable program stored thereon for processing an image, wherein the program when executed by a computer, performs the following steps:
a first conversion step of performing a first conversion process of converting a size of a predetermined first pixel area to a predetermined size with respect to first pixel signals, which are output from first pixels arranged in the first pixel area, within an area of all of a plurality of pixels arranged in a two dimensional matrix form, and outputting first image data;
a second conversion step of performing a second conversion process of converting a size of a second pixel area to a predetermined size with respect to second pixel signals output from second pixels arranged in the second pixel area, which is smaller than the first pixel area, within the area of all the plurality of pixels, and outputting second image data;
an operating mode change step of changing an operating mode, in which pixel signals are output from the pixels, in response to the size of the second pixel area, and
a moving image data generating step of performing a compressing process on the first image data to generate first moving image data and performing the compression process on the second image data to generate second moving image data, wherein,
when the first moving image data and the second moving image data are recorded in a memory at a same time, the operating mode is changed, and
when only one of the first moving image data and the second moving image data is recorded in the memory, the operating mode is unchanged.

\* \* \* \* \*